United States Patent [19]
Chamberlin

[11] 4,378,577
[45] Mar. 29, 1983

[54] METHOD AND APPARATUS FOR RECORDING AND DETECTING INDICATING SIGNALS IN A RECORDING AND/OR REPRODUCING DEVICE

[75] Inventor: David B. Chamberlin, Milford, Conn.

[73] Assignee: Dictaphone Corporation, Rye, N.Y.

[21] Appl. No.: 178,357

[22] Filed: Aug. 15, 1980

[51] Int. Cl.[3] .................... G11B 17/00; G06F 7/38; G11B 19/00
[52] U.S. Cl. .................... 360/72.2; 235/463; 360/72.3; 369/28; 369/27; 377/44
[58] Field of Search .................... 360/137, 72.3, 74.2, 360/74.4, 72.2; 369/25, 27, 28; 235/92 K, 92 CC, 463

[56] References Cited

U.S. PATENT DOCUMENTS

| | | | |
|---|---|---|---|
| 3,881,072 | 4/1975 | Becker | 369/28 |
| 4,007,491 | 2/1977 | Bolick | 369/27 |
| 4,051,540 | 9/1977 | Wilder | 360/72.3 |
| 4,062,048 | 12/1977 | Weber | 360/72.3 |
| 4,200,893 | 4/1980 | Matison | 369/28 |
| 4,272,675 | 6/1981 | Blanford | 235/463 |
| 4,291,221 | 9/1981 | Muehlbauer | 235/92 CC |

*Primary Examiner*—Robert M. Kilgore
*Attorney, Agent, or Firm*—Curtis, Morris & Safford

[57] ABSTRACT

To record an indicating signal on a record medium, the actuation of a cue signal recording switch is detected, and then the count of a cue signal cycle counter is sensed to determine if it has reached a preselected count. This counter is incremented by one count until the preselected count has been reached, whereupon it is reset to an initial count, and a cue counter is incremented by one count. Then, the count of the cue counter is sensed to determine if it is less than a particular count and, if so, a cue signal is recorded. If the cue count is not less than the particular count, the recording of the cue signal is terminated, thus representing one type of indicating signal. Recording of the cue signal continues until the cue counter reaches its particular count, even if the cue signal recording switch is deactuated. The foregoing steps are repeated substantially periodically in accordance with the programmed instructions of a processor. If the cue signal recording switch is re-actuated prior to the time that the cue counter reaches its particular count, the recording of the cue signal is interrupted for a predetermined duration, and then is resumed until the cue counter reaches a higher count, thus resulting in the recording of two bursts of cue signal to represent a second type of indicating signal. When the recorded cue signal is reproduced, the count of yet another counter is incremented even after the reproduced cue signal has terminated. If this count reaches a predetermined count, an indication of the first type of indicating signal is provided. However, if reproduction of the cue signal from the record medium resumes prior to the time that this counter reaches its predetermined count, an indication of the second type of indicating signal is provided.

49 Claims, 20 Drawing Figures

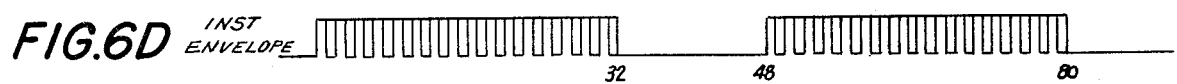
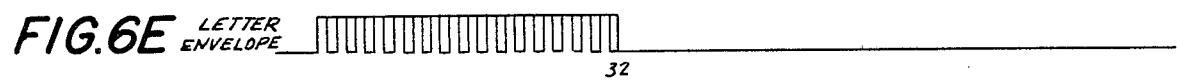
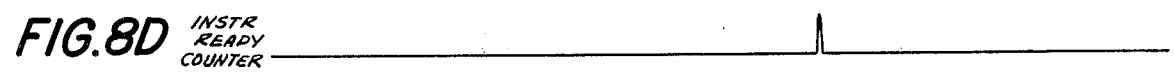
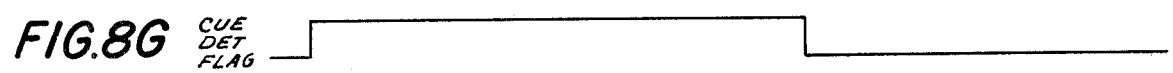
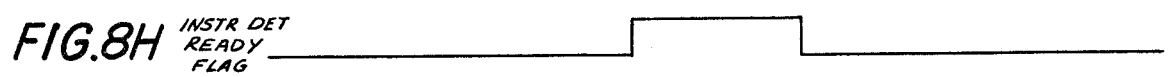
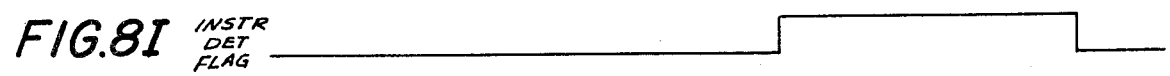

METHOD AND APPARATUS FOR RECORDING AND DETECTING INDICATING SIGNALS IN A RECORDING AND/OR REPRODUCING DEVICE

BACKGROUND OF THE INVENTION

This invention relates to a method and apparatus for recording and detecting indicating signals, commonly referred to as "cue" signals on a record medium in recording and/or reproducing apparatus and, more particularly, wherein such cue signals are used to indicate the relative locations of particular information, such as ends of messages, instructions, and the like, recorded on a record medium.

In many recording/reproducing devices, such as dictation/transcription machines, it is desirable to provide indications of different types of information which is recorded on the record medium used with such machines. Typically, these indications have been categorized broadly as "letter" and "instruction" indications, referring to the relative location of the end of a letter and of a dictated instruction, respectively. Such indications generally are helpful to a transcriptionist in transcribing the information which a dictator has recorded. In earlier machines, such indications are provided by suitable marks which are scribed on an index scale as the dictator is recording his message. Of course, when the record medium is loaded into a transcribing machine for transcription of the dictated messages, the prepared index scale also must be loaded into that machine so as to apprise the operator of the relative locations of the "letters" and "instructions" which have been recorded.

A marked improvement to the use of such scribed index scales for indicating the locations of ends of letters and instructions has been developed, whereby "letter" and "instruction" signals are electronically recorded on the very same record medium upon which the dictated messages are recorded. These signals, commonly referred to as "cue" signals, are of a predetermined frequency and can be detected electronically by suitable devices in the dictation/transcription machine prior to the transcription of the dictated information. One such system is disclosed in U.S. Pat. No. 4,051,540, wherein visual indicators, such as light emitting diodes (LED's) are selectively energized to provide appropriate indications of the locations of such recorded cue signals. An improvement to this system is disclosed in U.S. Pat. No. 4,200,893, wherein the visual indicators are controlled by a microprocessor.

In the electronic indicator systems disclosed in the aforenoted patents, particular electronic circuits are utilized to record and detect the cue signals. Typically, a recorded cue signal is formed of a burst of an oscillating tone of predetermined frequency. The burst is of a predetermined duration. When the record medium is driven at relatively high speeds in either the forward or reverse direction, the recorded bursts of cue signals are detected and indicated.

In some dictation/transcription machines in which cue signals are recorded, the very same burst of cue signal is used to indicate the location of an end of letter and of an instruction. If a so-called "letter cue" cannot be distinguished from a so-called "instruction cue", the transcriptionist may not easily discern the whereabouts of such information, thus complicating the transcription of the recorded information. Accordingly, it has been proposed that separate letter and instruction cue signals be recorded. In one such proposal, these different types of cue signals are recorded with different frequencies. However, this adds to the complexity of the cue signal recording and detecting circuitry, thus adding to the overall cost of the dictation/transcription machine. In accordance with another proposal, it has been suggested that separate tracks be dedicated for the recording of the letter and instruction cue signals, respectively. This, however, reduces the amount of record medium which is available for recording useful information, such as the dictator's messages.

It is one advantageous feature of the present invention to record separately distinguishable letter and instruction cue signals which overcome the aforenoted disadvantages.

With the advent of the microprocessor, various switching and control functions which heretofore have been carried out by discrete circuitry, electro-mechanical switching devices, and the like, now can be carried out under microprocessor control. By substituting a single microprocessor for multiple circuits and switching devices, the overall cost of the equipment which contains that microprocessor has been reduced and, moreover, reliability is improved. In accordance with yet another advantageous feature of the present invention, a microprocessor is used in a dictation/transcription machine to control the operation thereof as selected by the dictator or transcriptionist in accordance with his actuation of various control switches. The capacity of this microprocessor is sufficiently adequate such that it also is used to control the recording and detection of the aforementioned letter and instruction cue signals.

OBJECTS OF THE INVENTION

Therefore, it is an object of the present invention to provide an improved method and apparatus for recording cue signals on a record medium in a recording device, such as a dictation machine.

Another object of this invention is to provide an improved method and apparatus for detecting the aforementioned cue signals which are reproduced from the record medium.

A further object of this invention is to provide a method and apparatus for recording and detecting both letter and instruction cue signals.

An additional object of this invention is to provide a microprocessor-controlled technique for generating letter and instruction cue signals and for detecting the reproduction of such letter and instruction cue signals from a record medium in a recording/reproducing device.

Yet another object of this invention is to provide a microprocessor for controlling the operating modes of a dictation/transcription machine in accordance with the selection by an operator thereof, which microprocessor also is used to generate and detect letter and instruction cue signals.

Various other objects, advantages and features of the present invention will become readily apparent from the ensuing detailed description, and the novel features will be particularly pointed out in the appended claims.

SUMMARY OF THE INVENTION

In accordance with this invention, predetermined cue signals are recorded on a record medium which is used by recording apparatus, such as a dictation machine, which apparatus includes a programmed processor, such as a microprocessor, that advances through a sequence of instructions at an instruction clock rate for selecting and controlling predetermined operating conditions of the apparatus. In recording the predetermined cue signal, the following sequential steps are carried out: (a) detecting the actuation of a cue signal recording switch; (b) sensing if a cue signal cycle counter has reached a preselected count and (i) if not, incrementing the cue signal cycle counter by one count and (ii) if so, resetting the cue signal cycle counter to an initial count and incrementing a cue counter by one count; (c) sensing if the count of the cue counter is less than a particular count and (i) if so, recording the cue signal and (ii) if not, terminating the recording of the cue signal; (d) continuing to record the cue signal until the cue counter reaches the particular count even if the cue signal recording switch is deactuated prior to the reaching of that particular count; and (e) substantially periodically repeating steps (a) through (d). In a preferred embodiment, the foregoing method also includes the steps of detecting if the cue signal recording switch is reactuated prior to the time that the cue counter reaches its particular count and, if so, interrupting the recording of the cue signal for the time required for the cue counter to reach a higher count, and then resuming the recording of the cue signal until the cue counter reaches a still higher count. In the preferred embodiment, a single actuation of the cue signal recording switch results in the recording of a single burst of cue signal, corresponding to a letter cue signal; and the iterative actuation of the cue signal recording switch results in the recording of two spaced-apart bursts of cue signal, corresponding to the recording of an instruction cue signal.

The foregoing cue signals are detected from the record medium by the following sequential steps which are also carried out by the processor: (a) detecting the reproduction of a cue signal from the record medium; and (b) incrementing a counter by one count if the cue signal is detected; (c) detecting if the cue signal reproduced from the record medium has terminated; (d) sensing if the last-mentioned counter has reached a predetermined count; (e) repeating steps (a) through (d); and (f) indicating the detection of a first type of indicating signal, such as the aforementioned letter cue signal, when the last-mentioned counter reaches its predetermined count and indicating the detection of a second type of indicating signal, such as the aforementioned instruction cue signal, when the reproduction of a cue signal from the record medium is detected once again but prior to the time that the last-mentioned counter reaches its predetermined count.

BRIEF DESCRIPTION OF THE DRAWINGS

The following detailed description, given by way of example, will best be understood in conjunction with the accompanying drawings in which:

FIGS. 6A-6E are timing diagrams which are useful in understanding the manner in which the cue signals are generated and recorded;

FIGS. 8A-8I are timing diagrams which are useful in understanding the operation of the flow chart shown in FIG. 7.

DETAILED DESCRIPTION OF CERTAIN PREFERRED EMBODIMENTS

Figure 1:
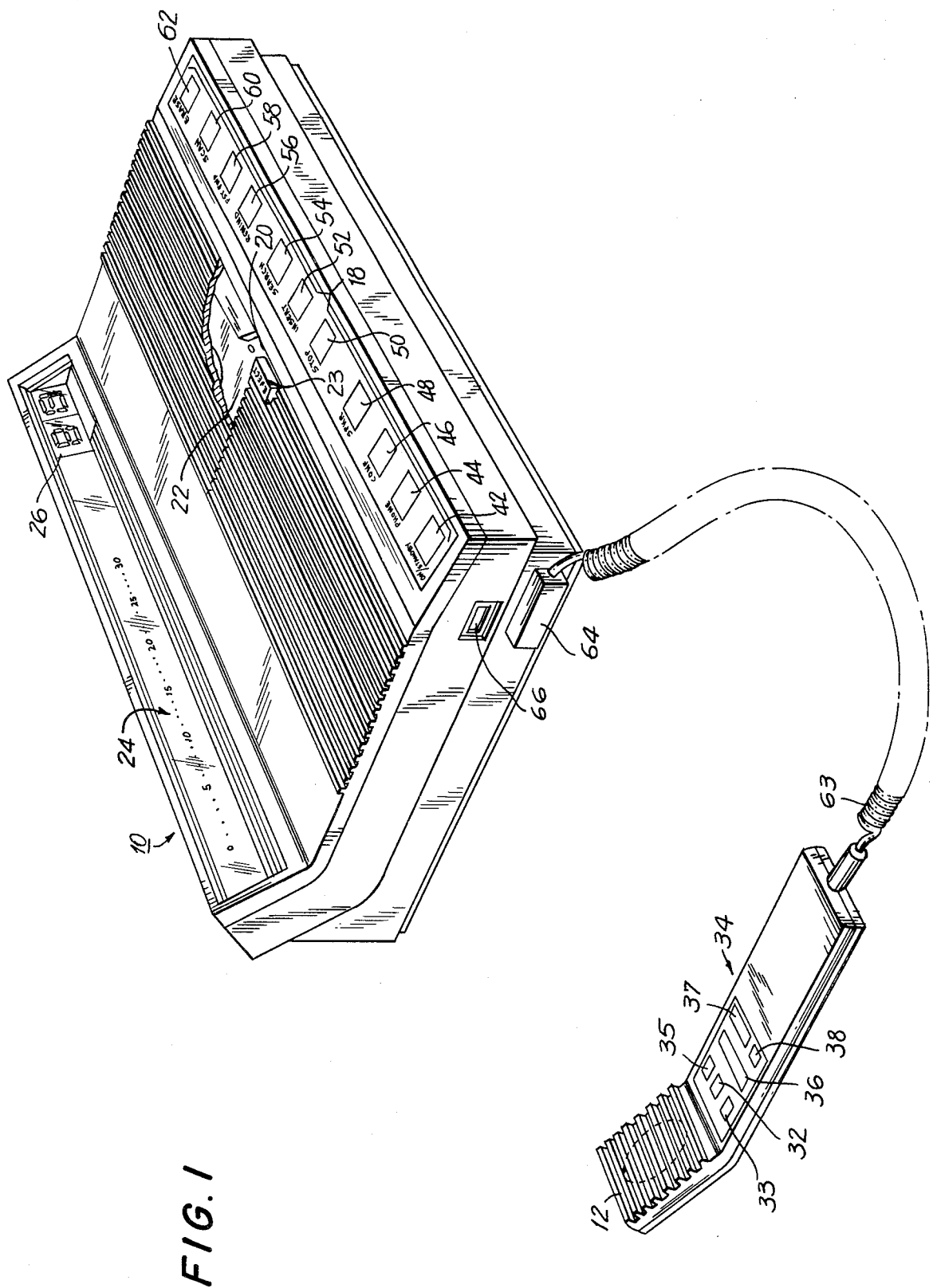
FIG. 1 is an overall view of one type of dictation/transcription machine with which the present invention can be used.

Referring now to the drawings, and in particular to FIG. 1, there is illustrated a representation of a dictation/transcription machine 10 with which the present invention finds ready application. This machine includes magnetic transducers, or heads, which are selectively controlled to operate as recording transducers for the recording of audio signals onto a magnetic record medium, such as magnetic tape, and also to reproduce such information. Suitable audio amplifiers, filters and other circuits are provided for the recording and reproduction of such signals. Also included in machine 10 is a so-called slow motor which is selectively energized to transport the magnetic tape at a normal speed at which the audio signals are recorded on and reproduced from that magnetic tape, and a so-called fast motor which is selectively energized to drive the magnetic tape at a relatively high speed in either the forward or reverse directions. A transmission (not shown) is provided such that the single fast speed motor imparts rotary motion in the forward or reverse directions in accordance with the selective actuation of a fast-forward or rewind selector, to be described. Recording, playback, fast-forward and rewind operations are conventional and well known to those of ordinary skill in the art. Preferably, the magnetic tape upon which the audio signals are recorded is contained within a tape cassette 22 disposed within a suitable cassette compartment 20 of machine 10. An EJECT button 23 is provided to expose cassette compartment 20 so as to load cassette 22 therein or to remove the cassette therefrom. Machine 10 is electrically connected to a hand-held microphone unit 12, whereby voice signals are supplied to the recording circuit of the machine from the microphone unit. The microphone unit also is provided with a loudspeaker such that signals which are reproduced from the magnetic tape are transduced selectively either by the loudspeaker integrally provided in machine 10 or by the loudspeaker integrally provided with microphone unit 12. As will be described, a suitable speaker control switch is provided on machine 10 to select either the machine speaker or the microphone speaker for transducing of the reproduced signals.

Microphone unit 12 also is provided with various control switches 34 which are manually operable to select various operating modes for machine 10. These control switches include a record-lock switch 32 which, when operated, selects and latches a recording mode for machine 10. In this mode of operation, the magnetic tape included within cassette 22 is driven at its normal speed, and the recording circuit is energized so as to record audio signals on the magnetic tape. These audio signals are, of course, produced by the microphone pick-up (not shown) which is provided in unit 12. This unit also includes a cue signal recording switch 33 which, when operated, initiates a cue signal generating-/recording mode whereby a cue signal is recorded on the magnetic tape. Preferably, this cue signal is recorded in the very same track in which the audio signals are recorded. As will be described below, if cue signal recording switch 33 is actuated once, a single burst of cue signal is recorded for a predetermined time duration. This cue signal is an oscillating signal of predetermined frequency and is sometimes referred to herein as a cue tone. In one embodiment, the frequency of this cue tone is 15 Hz. If cue signal recording switch 33 is released and then re-actuated within a predetermined time period, to be described, then two successive bursts of cue tone are recorded, these two bursts being separated by a predetermined interval. As will be described, the single burst of cue tone is used as a letter cue signal, representing the end/beginning of a letter, message, or the like. The two bursts of cue tone represent an instruction cue signal and may be used to indicate the location of particular instructions which are recorded by the user of machine 10. If desired, cue signal recording switch 33 may be replaced by a so-called letter switch and an instruction switch. Actuation of the letter switch results in the recording of a single burst of cue tone; and the actuation of the instruction switch results in the recording of two bursts of cue tone.

Microphone unit 12 also is provided with a fast-forward switch 35. When this fast-forward switch is actuated, the fast-forward mode of operation is selected for machine 10. It is appreciated that, in the fast-forward mode, the magnetic tape is transported in the forward direction at a relatively high speed. It will be described below that, in this fast-forward mode, as selected by the actuation of fast-forward switch 35 on microphone 12, if a cue signal is recorded on the magnetic tape, this cue signal is detected and a suitable indication is provided to the user. Thus, actuation of fast-forward switch 35 allows the user to access rapidly particular information on the magnetic tape, the location of which is indicated by a previously recorded cue signal.

Microphone unit 12 also is provided with a record switch 36 which, when actuated, disposes machine 10 in the recording mode of operation. Record switch 36 is similar to record lock switch 32, except that the actuation of the record switch maintains the recording mode of operation only for so long as this switch remains actuated. As mentioned above, the actuation of record lock switch 32 latches the machine in the recording mode until, for example, stop switch 38 is operated.

Stop switch 38, in addition to releasing machine 10 from the record mode which had been selected by the actuation of record-lock switch 32, also releases the machine from the play mode. This latter mode is selected by the actuation of rewind/play switch 37. When this switch is actuated, the aforementioned fast motor is energized so as to rewind the magnetic tape at its relatively high speed. Upon the release of rewind/play switch 37, the fast motor is de-energized, and the slow motor is energized so as to drive the magnetic tape in its forward direction at its normal speed. Furthermore, the reproducing circuit included within machine 10 is conditioned so as to reproduce audio signals from the magnetic tape. As mentioned above, these audio signals are transduced by the speaker integrally provided within machine 10 or by the speaker integrally provided in microphone unit 12.

Preferably, control switches 34 are spring-actuated, except that record-lock switch 32 may be a releasable-locking switch. When any of the control switches is actuated, or "pushed", a suitable signal, preferably an encoded signal, is produced to identify the particular switch which has been actuated and thus represents the particular operating mode which has been selected. If the control switches are of the spring-loaded push-button type, then the release of the actuated switch terminates this identifying signal. An encoder may be provided in microphone unit 12 so as to produce a 3-bit digital signal identifying the particular control switch which has been actuated. This 3-bit signal is communicated to a connector plug 64 by a multi-wire cable 63.

Although not shown in FIG. 1, the jack, or connector, into which plug 64 is inserted also is adapted to receive a plug which is electrically coupled to a foot-pedal switch arrangement, whereby a transcriptionist may establish selective operating modes for machine 10 in order to transcribe information which has been dictated onto the magnetic tape. For example, the foot-pedal switch arrangement may produce 3-bit signals identifying the actuation of a play switch, a fast-forward switch, a rewind switch and the like. In addition, a particular electrical connecting pin on the connector to which plug 64 is inserted may be adapted to be selectively short-circuited when microphone unit 12 is connected thereto and may be open-circuited when the foot-pedal switch arrangement is connected, thereby applying a predetermined signal level at this pin to identify whether a microphone unit or a foot-pedal switch arrangement is connected to machine 10. It will be appreciated that this particular signal facilitates the interpretation of the 3-bit signal which is supplied to the connector either in response to the actuation of control switches 34 of microphone unit 12 or in response to the selected actuation of the foot-pedal switch arrangement.

Machine 10 also is provided with a connector 66 adapted to receive a head-phone plug so as to supply reproduced audio signals to head-phone transducers which may be connected thereto. A transcriptionist thus is provided with audible signals via such head-phone transducers, in order to transcribe the information which has been recorded.

Although not illustrated herein, machine 10 also is provided with a cradle switch disposed within a cradle structure adapted to receive and support microphone unit 12 when the machine is not operated. This cradle switch is used as a power on/off control so as to supply appropriate electrical power to machine 10 whereby the desired operation thereof can be performed.

Also not shown in FIG. 1 is a connector adapted to be coupled to a telephone adapter unit, whereby the machine may communicate via conventional telephone lines. A suitable telephone adapter is described in co-pending application Ser. No. 146,779, and is operable to control machine 10 to function as a telephone-answering device.

Dictation/transcription machine 10 is provided with a plurality of control switches 18, each switch being manually operable to control a particular function or establish an appropriate mode of operation. Typical of such control switches are a POWER switch 42, a TELEPHONE switch 44, a CONFERENCE switch 46, a SPEAKER switch 48, a STOP switch 50, an INSERT switch 52, a SEARCH switch 54, a REWIND switch 56, a FAST FORWARD switch 58, a SCAN switch 60 and an ERASE switch 62. Preferably, each of these switches is formed as a so-called touch-sensitive switch and is adapted to produce a signal representing the actuation thereof when touched by the user of machine 10. For purposes of the present discussion, the POWER, TELEPHONE, CONFERENCE and SPEAKER switches are referred to herein as "toggle" switches, and the remaining switches are referred to herein as keyboard switches. As suggested by the expression "toggle", each toggle switch is actuated when touched by the user, and remains actuated even if the user removes his finger therefrom. To deactuate the switch, that is, to release the mode of operation selected thereby, the actuated switch must be touched again.

POWER switch 42 is adapted, when actuated, to supply energizing power to dictation/transcription machine 10. When changed over to its "on" condition, POWER switch 42 supplies suitable energization to power, or drive, the normal-speed and fast-speed motors, the recording and reproducing circuitry, and various additional accessory devices (not shown) which might be connected to the dictation/transcription machine. Actuation of POWER switch 42 is detected by a microprocessor and is indicated by the illumination of a suitable indicating lamp which, preferably, is disposed beneath the POWER switch. It should be appreciated that this microprocessor normally is supplied with energizing potential even when POWER switch 42 is in its "off" condition. Hence, a voltage regulating circuit included within dictation/transcription machine 10 may be connected directly to AC mains in order to supply the microprocessor with such energizing potential.

POWER switch 42 cooperates with a so-called accessory power switch for supplying energizing power to the dictation/transcription machine. This accessory power switch may be included in an accessory device (not shown) which might replace microphone unit 12 for use with dictation/transcription machine 10. For example, a typical telephone-type handset may be used, and this telephone-type handset may be provided with an accessory power switch. Additionally, dictation/transcription machine 10 may be provided with a cradle (not shown) to support, or store, microphone unit 12 during those periods when the machine is not used. A suitable cradle power switch may be provided such that when microphone unit 12 is removed from the cradle, the cradle power switch assumes its ON condition. Still further, the aforementioned telephone adapter which may be used with dictation/transcription machine 10 may, when operated, such as in response to an incoming telephone call, supply a "power-on" signal to the microprocessor, thus simulating the manual actuation of POWER switch 42. The manner in which operation of the power switch functions to turn power "on" or "off" is described in greater detail in copending application Ser. No. 178,106, filed Aug. 14, 1980, now U.S. Pat. No. 4,328,397.

TELEPHONE switch 44 is adapted, when actuated, to enable dictation/transcription machine 10 to respond to incoming telephone calls. In this mode, the dictation/transcription machine is capable of functioning either as a telephone-answering machine or as a so-called remote dictating machine. In the latter mode of operation, audio information, such as dictation, is transmitted to the machine via telephone lines for recording on the magnetic tape in cassette 22. The manner in which dictation/transcription machine 10 operates in this telephone mode of operation is described in aforementioned copending application Ser. No. 146,779.

In addition, when TELEPHONE switch 44 is actuated, energizing power is supplied to the dictation/transcription machine even if POWER switch 42 had assumed its "off" condition. Also, indicator lamps which, preferably, are provided beneath each of POWER switch 42, TELEPHONE switch 44, CONFERENCE switch 46 and SPEAKER switch 48 are illuminated to indicate that machine 10 has been operated to assume its telephone mode of operation. When TELEPHONE switch 44 is actuated once again, the telephone mode of operation is terminated and, moreover, the previous conditions associated with POWER switch 42, CONFERENCE switch 46 and SPEAKER switch 48 are resumed. That is, dictation/transcription machine 10 assumes the same mode of operation that it had assumed prior to the original actuation of TELEPHONE switch 44. This is described in greater detail in U.S. Pat. No. 4,328,397.

CONFERENCE switch 46 is adapted, when actuated, to establish a "conference" mode of recording. In this mode, the amplification of the audio signals which are recorded on the magnetic tape is increased. Thus, audible signals of relatively low level received by microphone unit 12 are amplified substantially so as to be recorded with sufficient gain. A "conference" among plural individuals who are located at varying distances from microphone unit 12 is recorded with adequate fidelity. In addition, when CONFERENCE switch 46 is actuated, the lamp disposed beneath the CONFERENCE switch is illuminated so as to provide a suitable indication that the conference mode has been assumed.

SPEAKER switch 48 is adapted, when actuated, to assume a first condition, whereby the loudspeaker included within dictation/transcription unit 10 is enabled, or to assume a second condition, whereby the loudspeaker included within microphone unit 12 is enabled. The enabled loudspeaker serves to transduce the audio signals which are reproduced from the magnetic tape, whereby these audio signals are reproduced as audible information which is readily perceived by the user. In addition, the indicator lamp disposed beneath SPEAKER switch 48 is illuminated when this switch assumes its first condition, and is extinguished when this switch assumes its second condition. If desired, this lamp may be illuminated when SPEAKER switch 48 assumes its second condition and may be extinguished when this switch assumes its first condition. A more detailed description of the manner in which the microprocessor detects the actuation of SPEAKER switch 48 is described in U.S. Pat. No. 4,328,397.

The remaining keyboard switches provided with dictation/transcription unit 10 now will be briefly described. STOP switch 50 is manually operable to establish a "stop", or quiescent, mode of operation for the dictation/transcription machine. Typically, switch 50 may be operated to terminate a fast-forward or rewind mode of operation. The microprocessor, when carrying out its programmed routine, detects the operation of the STOP switch so as to establish the "stop" mode.

INSERT switch 52 is adapted, when actuated, to establish an "insert" mode of operation, whereby audio information is recorded, via microphone unit 12, onto a separate channel, or track, of the magnetic tape in cassette 22. As is conventional, the magnetic tape in this cassette is provided with at least two tracks for recording information. Normally, information is recorded on one track while the magnetic tape is driven from its supply reel to its take-up reel. If cassette 22 is turned over, the second track is used to record such audio information. In the "insert" mode, as established by the actuation of INSERT switch 52, normal dictation is recorded on one track and special "insert" information is recorded on the second track. In addition, a superimposed, higher frequency tone signal is recorded on the first track so as to indicate the location along the magnetic tape at which the "insert" information is recorded on the second track.

As will also be described, when a transcriptionist prepares to transcribe dictation which has been recorded on the magnetic tape, SCAN switch 60 is actuated to rewind the tape and, during this rewind operation, to detect all letter and instruction indicator signals which have been recorded thereon. The relative locations along the tape at which such letter and instruction indicator signals are recorded are indicated by an index-/instruction display 24. Then, once the tape is satisfactorily rewound, SEARCH switch 54 may be actuated to establish a "search" mode of operation, whereby the tape now is driven in the forward direction at a relatively fast speed. In this "search" mode, whenever an instruction indicator signal is detected, the mode of operation of dictation/transcription 10 is changed over to a "play" mode; and instructional information, which may be recorded following the instruction indicator signal, is reproduced. Thus, prior to the actual transcription of the information recorded on the magnetic tape, the transcriptionist is made aware of the instructional information which may have been recorded so as to improve efficiency in the overall transcription.

To carry out the "insert" mode of operation, the recording/playback transducer, or head, preferably is provided with two channels, or gaps, respectively aligned with the two tracks of the magnetic tape. During normal dictation, the audio signals are supplied to the first channel so as to be recorded in the first track. In response to the actuation of INSERT switch 52, the audio signals are supplied to the second channel so as to be recorded in the second track. During a normal playback mode of operation, the audio signals which had been recorded on the first track are reproduced by the first channel of the recording/playback transducer. The inserted information is reproduced from the second track by the second channel of the transducer.

If desired, the user of dictation/transcription machine 10 may record special instructional information in the very same track in which normal dictation is recorded, that is, in the first track. The location of such instructional information is indicated by recording an instruction indicating signal in the manner described hereinabove. That is, the dictator may actuate cue switch 33 on microphone unit 12 twice in succession or, alternatively, may operate an instruction switch. When SEARCH switch 54 is actuated, the magnetic tape in cassette 22 is driven in the forward direction at its fast speed, and cue signal detecting electronics (not shown) are energized to detect instruction indicating signals. Upon detection of such an instruction indicating signal, the mode of operation of dictation/transcription unit 10 is changed over to a normal play mode, whereby the instructional information which is recorded in the first track on the magnetic tape is reproduced. Thus, when SEARCH switch 54 is actuated, the magnetic tape is scanned, or searched, for the location of instruction indicating signals, and then the instructional information which is recorded following such instruction indicating signals is reproduced.

REWIND switch 56 is adapted, when operated, to produce a rewind actuating signal which is supplied to the microprocessor. This rewind actuating signal is detected and used to establish a "rewind" mode, whereby a rewind circuit (not shown) is actuated, and a suitable fast-speed drive motor is energized to transport the magnetic tape in the reverse direction at the fast speed.

FAST FORWARD switch 58 may be similar to REWIND switch 56 and is adapted, when operated, to establish the "fast-forward" mode of operation. More particularly, the operation of the FAST FORWARD switch produces an actuating signal which is detected by the microprocessor to energize a fast-forward circuit and to energize the fast-speed motor, whereby the magnetic tape is driven in the forward direction at the fast speed. In one embodiment, the operation of either REWIND switch 56 or FAST FORWARD switch 58 does not enable the detection of letter or instruction indicating signals recorded on the magnetic tape. Rather, the tape merely is transported in the reverse or forward direction, as selected.

SCAN switch 60, when operated, produces a scan signal which is detected by the microprocessor. When this scan signal is detected, the microprocessor serves to establish the "scan" mode of operation, described above. Thus, the fast-speed motor is energized to rewind the magnetic tape in cassette 22; and cue signal detecting electronics are enabled to detect letter and instruction indicating signals which may be recorded on the magnetic tape. When a letter indicating signal is detected, an indication thereof is provided on index/instruction display 24. When an instruction indicating signal is detected, a suitable instruction indication is provided on the index/instruction display.

ERASE switch 62 is adapted to be actuated concurrently with either REWIND switch 56 or FAST-FORWARD switch 58 so as to establish an "erase" mode. The actuation of the respective switches is detected by the microprocessor which serves to energize the fast-speed motor so as to drive the magnetic tape in either the reverse or forward direction. Also, an electromagnetic erase circuit is triggered so as to erase the audio information which may have been recorded previously on the magnetic tape.

As illustrated, dictation/transcription unit 10 also is provided with index/instruction display 24 and with a numerical display 26. The index/instruction display may be of the type described in U.S. Pat. No. 4,200,893. As mentioned above, this display provides indications of the locations of particular letter and instruction indicating signals which are recorded on the magnetic tape, which signals are detected during a "scan" or a "search" operation. Display 24 also provides an index, or cursor, indication of the present relative location of the magnetic tape. Thus, as the tape is driven in a particular direction (i.e. either in the forward or reverse direction), a respective display element, such as a light source, an LED, an LCD, or the like, is energized to indicate that portion of the tape which is at or within the vicinity of the recording/playback transducer. As the tape is advanced from one end towards the other, a corresponding cursor indication is advanced across display 24. A further description of index/instruction display 24 is set out in the aforementioned U.S. Pat. No. 4,200,893.

Numerical display 26 may be comprised of a multi-digit display, such as a two- or three-digit seven-segment display which, among other functions is adapted to display the total length of dictation which has been recorded on the magnetic tape. This display may be controlled by a counter which counts pulses, referred to herein as chopper pulses, that are produced when the tape is transported. In one embodiment, a so-called chopper wheel is mechanically coupled to the supply (or take-up) drive spindle and is rotated as tape is transported so as to periodically interrupt a light beam which impinges upon a photodetector. Each interruption of the light beam produces a chopper pulse. Hence, the frequency of these chopper pulses is a function of the speed at which the tape is driven and also a function of the amount of tape which remains on the supply (or take-up) reel. In another embodiment, the chopper wheel is comprised of a disk having a plurality of magnetic pole elements disposed circumferentially thereabout. As the tape is transported, this chopper wheel rotates so as to pass successive pole elements across a magnetic pick-up device, such as a pick-up coil. A chopper pulse is produced in response to the passage of each pole element across the pick-up coil.

As mentioned above, a microprocessor is provided for controlling the various operating conditions of dictation/transcription machine 10 in response to the actuation of any of the toggle switches, the keyboard switches or the switches provided on microphone unit 12. This microprocessor also is responsive to certain additional switches, such as foot-pedal switches, a cradle power switch and switches on an accessory that may be connected to the machine. As described above, a digital signal is supplied from microphone unit 12 to dictation/transcription machine 10 representing the actuation of a selected one of the switches included in the microphone unit. In the event that the microphone unit is replaced by a foot-pedal switching arrangement, a digital signal is supplied to the dictation/transcription machine representing the particular switch in that arrangement which has been actuated. Similarly, if the cradle power switch is opened or closed, or if the accessory switches are actuated, these conditions are represented by a digital signal supplied to the machine. Also, if any of the toggle or keyboard switches 18 is actuated, a signal representing the actuation of the particular switch is produced. An encoder is responsive to the aforementioned digital signals and actuating signals to produce a plural-bit signal representing the particular switch which has been actuated. This plural-bit signal is supplied to the microprocessor which, for example, may be a Model COPS 420, manufactured by National Semiconductor. In addition, the microprocessor may be supplied with the chopper pulses which are produced by the apparatus described above, with a signal representing the detection of a cue signal reproduced from the magnetic tape, and with a signal representing the presence or absence of a cassette 22 in compartment 20. The signal representing the detection of a cue signal may be derived from a cue signal detector, such as described in the aforementioned U.S. Pat. No. 4,200,893. The signals representing the presence or absence of a cassette 22 may be produced by a suitable switch which is closed when a cassette is loaded in compartment 20.

It may be appreciated that the functions performed by the microprocessor may be carried out by equivalent hard-wired logic circuitry. However, such hard-wired logic circuitry is relatively expensive and is difficult to assemble. Furthermore, the possibility of a fault or other malfunction in such hard-wired logic circuitry is greater than the possibility of a comparable fault or malfunction in the microprocessor. For these reasons, it is preferred that a microprocessor be used to control the selected operating conditions of dictation/transcription machine 10.

The programming of a microprocessor to carry out particular sequential instructional routines during a program cycle is well known to those of ordinary skill in the art. The relevant instructional program by which the microprocessor included in dictation/transcription machine 10 carries out the features of the present invention will, therefore, be described in terms of flow charts. These flow charts describe the overall broad function of the microprocessor, and further describe those particular routines by which the present invention is carried out. A programmer having ordinary skill in the art would be readily enabled to program a microprocessor, or other programmed processor, such as a mini-computer or the like, from the flow charts which now will be described.

Figure 2:
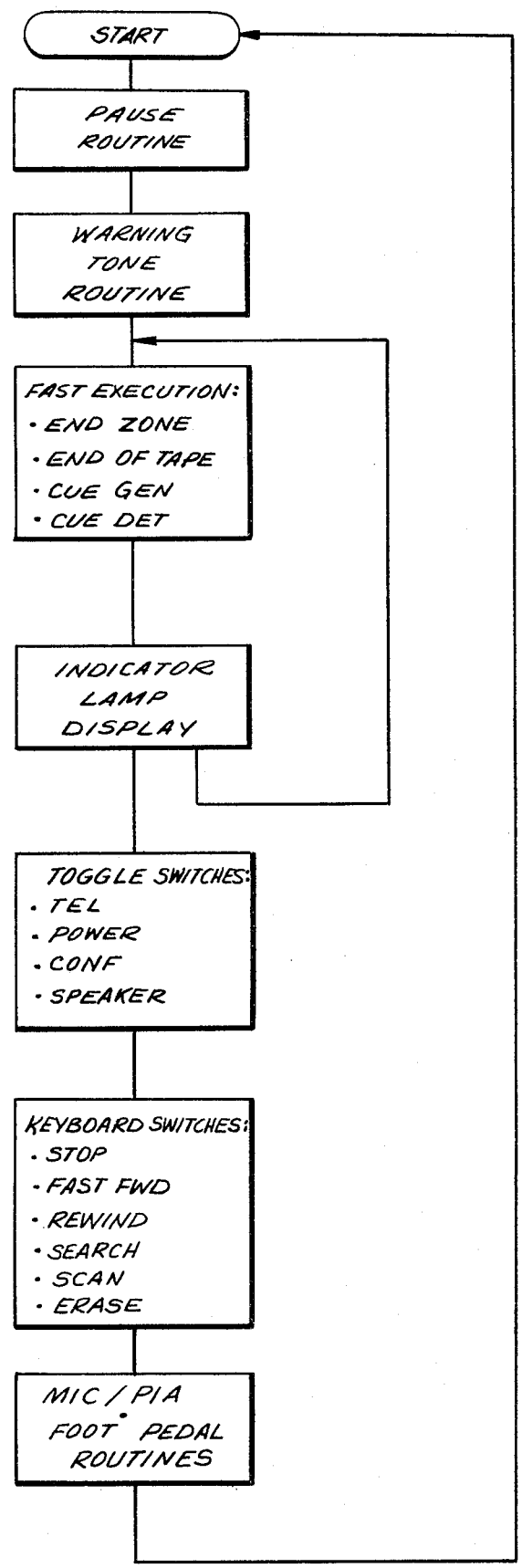
FIG. 2 is an overall flow chart of operation of the microprocessor which is used with the machine shown in FIG. 1 for controlling the operation of that machine and for generating and detecting letter and instruction cue signals.

Turning to FIG. 2, there is illustrated an overall flow chart representing the operation of the microprocessor through one complete program cycle. A suitable clock (not shown) generated successive clock pulses which are used for advancing the microprocessor through a sequence of instructions. Initially, the microprocessor advances from its START condition to carry out a pause routine. This pause routine is illustrated in the flow chart shown in FIG. 3 and is responsive to certain predetermined conditions which, when detected, serve to halt temporarily the forward or reverse movement of the magnetic tape. The duration of this "pause" of tape movement is determined by a pause counter that is incremented in synchronism with the instruction clock pulses.

After cycling through the pause routine, the microprocessor carries out a warning tone routine. This warning tone routine serves to produce a warning tone in response to the existence of certain conditions, including the condition that the tape has been temporarily halted. Other conditions which are sensed during the warning tone routine are described in conjunction with the flow chart of FIG. 3.

After cycling through the warning tone routine, the microprocessor program advances to the so-called "fast execution" routine. The fast execution routine is adapted to sense when the magnetic tape has been advanced to its end zone, or when the end of the magnetic tape has been reached, or when a cue signal is generated for recording a letter or instruction indicating signal, or when a cue signal is detected, as when a letter or instruction indicating signal is sensed. The "end zone" is intended to describe that section of the magnetic tape which is reached wherein less than a predetermined amount of tape remains on the supply reel. For example, if a cassette is used having a quantity of magnetic tape capable of recording up to thirty minutes of dictation, the end zone is reached when the tape has been transported from the supply reel to the take-up reel such that the amount of tape remaining for the recording of new dictation is equal to a dictation time of about 2-3 minutes. The end zone subroutine senses when this amount of magnetic tape remains, and a suitable end zone indication is provided so as to warn the dictator that he soon will approach the end of tape. This end zone detection and warning subroutine is carried out when dictation/transcription machine 10 operates in its "record" mode, either to record dictation from microphone unit 12 or to record incoming telephone messages that are received via the telephone adapter (not shown).

The end-of-tape (EOT) subroutine serves to detect when the tape has been fully transported either from the supply reel to the take-up reel or from the take-up reel back to the supply reel, and to provide a suitable indication thereof. The EOT condition may arise during the "record", "play", "fast-forward", or "rewind" operations of dictation/transcription machine 10. The EOT indication apprises the user of the machine that the end (or beginning) of the tape has been reached.

The cue generate subroutine is described in greater detail below and is adapted to detect when cue switch 33 is operated and to record either a letter or instruction indicating signal, depending upon the selected operation of the cue switch. As described above, the cue signal is an oscillating signal of predetermined frequency, for example, 15 Hz. A letter indicating signal is constituted by a single burst of cue signal of predetermined duration; and an instruction indicating signal is constituted by two successive bursts of the cue signal, each of these bursts being of the same predetermined duration and separated by a defined interval. The cue detect subroutine is carried out during, for example, "scan", "search", "fast-forward" and "rewind" modes of operation; and serves to detect the reproduction of a cue signal. If the reproduced cue signal is detected as being a letter indicating signal, a letter-indicating light element of display 24 is energized so as to indicate the relative location of the recorded letter indicating signal. Conversely, if the sensed cue signal is a detected instruction indicating signal, then a suitable light element of display 24 is energized so as to apprise the operator of the relative whereabouts of the recorded instruction indicating signal. Various additional functions are carried out during the cue detect subroutine, as will be described below.

The aforementioned subroutines included in the fast execution routine are carried out sequentially. When the programmed microprocessor cycles through the complete fast execution routine, an indicator lamp display routine is carried out. For the purpose of the present discussion, it is assumed that indicator lamps are provided beneath at least the following toggle and keyboard switches: TELEPHONE switch 44, CONFERENCE switch 46, SPEAKER switch 48, SEARCH switch 54, REWIND switch 56, FAST-FORWARD switch 58, SCAN switch 60 and ERASE switch 62. Indicator lamps also may be provided beneath POWER switch 42 and INSERT switch 52. The POWER indicator lamp may be illuminated whenever energizing power is supplied to dictation/transcription machine 10, as when the POWER switch is actuated, a cradle switch is closed, an accessory power switch is closed, or the like. The INSERT indicator lamp may be energized when a suitable insert signal is produced in response to the actuation of INSERT switch 52. The remaining indicator lamps are selectively energized by the microprocessor, one lamp at a time, during the indicator lamp display routine. Each indicator lamp, when energized, draws a significant amount of current therethrough. That is, when an indicator lamp first is turned on, a significant amount of energizing current flows therethrough. To minimize current requirements, each of the TELEPHONE, CONFERENCE, SPEAKER, SEARCH, REWIND, FAST-FORWARD, SCAN and ERASE indicator lamps is interrogated in sequence and, if the interrogated lamp is to be energized, that lamp is illuminated. In accordance with the flow chart shown in FIG. 2, at the completion of one cycle of the fast execution routine, one of these indicator lamps is interrogated and, if appropriate, it is illuminated. Then, the programmed routine returns to the fast execution routine to perform another cycle thereof. At the completion of this cycle, the next indicator lamp is interrogated and selectively energized. This recycling of the fast execution routine, followed by the indicator lamp display routine, is carried out until all eight of these indicator lamps are interrogated and selectively energized. At the completion of the eighth cycle of the fast execution and indicator lamp display routines, the programmed microprocessor advances to the switch detecting routines.

The switch detecting routines are divided into three separate routines: the toggle switch routine, the keyboard switch routine and the microphone switch routine. These routines are adapted to detect which, if any, of the toggle switches has been actuated, which, if any, of the keyboard switches has been actuated and which, if any, of the microphone unit switches has been actuated, respectively. The toggle switch routine is described in greater detail in U.S. Pat. No. 4,328,397. As described therein, the toggle switch routine detects if TELEPHONE switch 44 has been actuated. If so, it is determined whether this is an initial or reactuation of the TELEPHONE switch. If it is determined that the TELEPHONE switch has been actuated for the first time, then dictation/transcription machine 10 is disposed in its "telephone" mode so as to record incoming telephone messages. If a telephone adapter (sometimes referred to herein as a phone-in adapter, or PIA) is connected to the machine, then the machine assumes its quiescent mode awaiting the receipt of an incoming telephone call. Also, energizing power is supplied to the machine to enable it to commence recording upon receipt of such an incoming telephone call.

Depending upon particular conditions and parameters which are present, at the completion of the telephone toggle switch subroutine, the programmed microprocessor either returns to its START condition or advances to the power subroutine. In this subroutine, the actuation of POWER switch 42 is detected, and either energizing power is supplied to dictation/transcription machine 10 in response to the initial actuation of this POWER switch, or energizing power is terminated in response to the re-actuation of this POWER switch. The power subroutine also detects whether the cradle switch (not shown) has been opened or closed, and also senses whether the telephone adapter (PIA) has received an incoming telephone call. These latter conditions also serve to selectively supply or terminate energizing power (that is, they serve to turn power on or off) to the dictation/transcription machine.

After carrying out the power subroutine, the programmed microprocessor advances to the conference subroutine to detect whether CONFERENCE switch 46 has been initially actuated or has been re-actuated. As mentioned above, actuation of the CONFERENCE switch establishes the "conference" mode of operation, wherein audio signals are subjected to a relatively higher level of amplification prior to recording. The re-actuation of this CONFERENCE switch terminates the "conference" mode.

After carrying out the conference subroutine, the programmed microprocessor advances to carry out the speaker subroutine, whereby the initial actuation or re-actuation of SPEAKER switch 48 is detected. Depending upon the selective actuation of this SPEAKER switch, one or the other of the loudspeakers provided in dictation/transcription machine 10 and in microphone unit 12 is selected for use. After the speaker subroutine is carried out, the programmed microprocessor advances to carry out the keyboard switch routine.

The foregoing description of the toggle switch routine has assumed that the telephone, power, conference and speaker subroutines are carried out sequentially in this order. If desired, these subroutines may be carried out in any other order.

The keyboard switch routine includes various subroutines which are carried out sequentially and in a predetermined hierarchy. This hierarchy is a function of the priority of the particular switch which is associated with the subroutine. Initially, the stop subroutine is performed to detect whether STOP switch 50 has been actuated. If so, all tape movement is terminated, or cancelled, and the operating mode in which dictation/-transcription unit 10 had been disposed also is terminated. Then, the keyboard switch routine advances to the fast-forward subroutine, whereby the operating mode of the machine is changed over to the fast-forward mode in response to the actuation of FAST-FORWARD switch 58. If this FAST-FORWARD switch had not been actuated, then the keyboard switch routine proceeds to the rewind subroutine to detect if REWIND switch 56 had been actuated. If so, the operating mode in which the dictation/transcription machine then is disposed is changed over to the "rewind" mode; whereby the magnetic tape is rewound at its relatively fast speed.

If the REWIND switch had not been actuated, the keyboard switch routine advances to the search subroutine to sense if SEARCH switch 54 had been actuated. If so, the existing mode of operation of dictation/transcription machine 10 is cancelled, and this machine then is changed over to its "search" mode operation. As mentioned above, in this "search" mode, the magnetic tape is driven in the forward direction at the fast speed, and instruction indicating signals, recorded as dual bursts of cue signals, are detected.

The initial subroutine carried out in the keyboard switch routine is the stop subroutine. If it is determined that the STOP switch has not been actuated, the scan subroutine is carried out. In this subroutine, actuation of SCAN switch 60 is detected to change over the dictation/transcription machine to the "rewind" mode of operation so as to detect cue signals which are reproduced while the magnetic tape is rewound.

In the event that SCAN switch 60 is not actuated, the keyboard switch routine advances to the erase subroutine. In this erase subroutine, the actuation of ERASE switch 62 is detected. The "erase" mode of operation is established if, concurrent with the actuation of ERASE switch 62, either REWIND switch 56 or FAST-FORWARD switch 58 also is actuated. In the "erase" mode, the magnetic tape is transported in either the reverse or forward direction, at fast speed, and the erase transducer is energized. Hence, all information which is recorded on the magnetic tape is erased therefrom.

After completing the keyboard switch routine, the programmed microprocessor advances to the microphone switch routine. This routine is adapted to sense which, if any, of the switches provided on microphone unit 12 is actuated, and to establish a corresponding operating mode in response thereto. The microphone routine also functions to detect various switch control signals that are produced by a telephone adapter (PIA) connected to dictation/transcription machine 10 when this machine is in its "telephone" mode of operation. Also, in the event that microphone unit 12 is replaced by a foot-pedal switching arrangement, the microphone switch routine serves to detect which of the foot-pedal switches is actuated to dispose the dictation/transcription machine in a corresponding mode of operation.

The microphone switch routine determines whether microphone unit 12 is connected to dictation/transcription machine 10 and, if so, detects the actuation of record lock switch 32, or the actuation of stop switch 38, or the actuation of record switch 36, or the actuation of cue switch 33. Depending upon which of these switches is actuated, the appropriate mode of operation of dictation/transcription machine 10 is established. In the event that none of these record lock, stop, record, and cue switches is actuated, the microphone routine advances to detect if fast-forward switch 35 or rewind switch 37 is actuated. If so, the corresponding "fast-forward" or "rewind" mode of operation is established. That is, the magnetic tape is driven at its fast speed in either the forward or reverse direction. Also, in either of these modes, the reproduction of a cue signal from the magnetic tape is detected and indicated, as will be described below.

In the event that microphone unit 12 is replaced by the foot-pedal switching arrangement, the microphone routine detects which, if any, of the fast-forward, rewind and play pedal switches is actuated, in this order. Depending upon which of these foot-pedal switches is actuated, the corresponding mode of operation (i.e. "fast-forward" or "rewind" or "play") is established.

After completing the microphone routine, the programmed microprocessor returns to its START condition and commences the pause routine once again. From the foregoing description, it is appreciated that the microprocessor completes one cycle of sequential instructions, during which one cycle the fast execution routine is performed a predetermined number of times, for example, eight times. That is, the pause routine is carried out, followed by the warning tone routine, and then the fast execution routine is performed followed by the indicator lamp display routine, these two routines being performed repeatedly, and at the instruction clock rate, eight successive times. After the fast execution routine and indicator lamp display routine have been performed for the eighth time, the programmed microprocessor advances to carry out the toggle switch routine, and then the keyboard switch routine, and then the microphone routine to complete one full cycle of the program.

Figure 3:
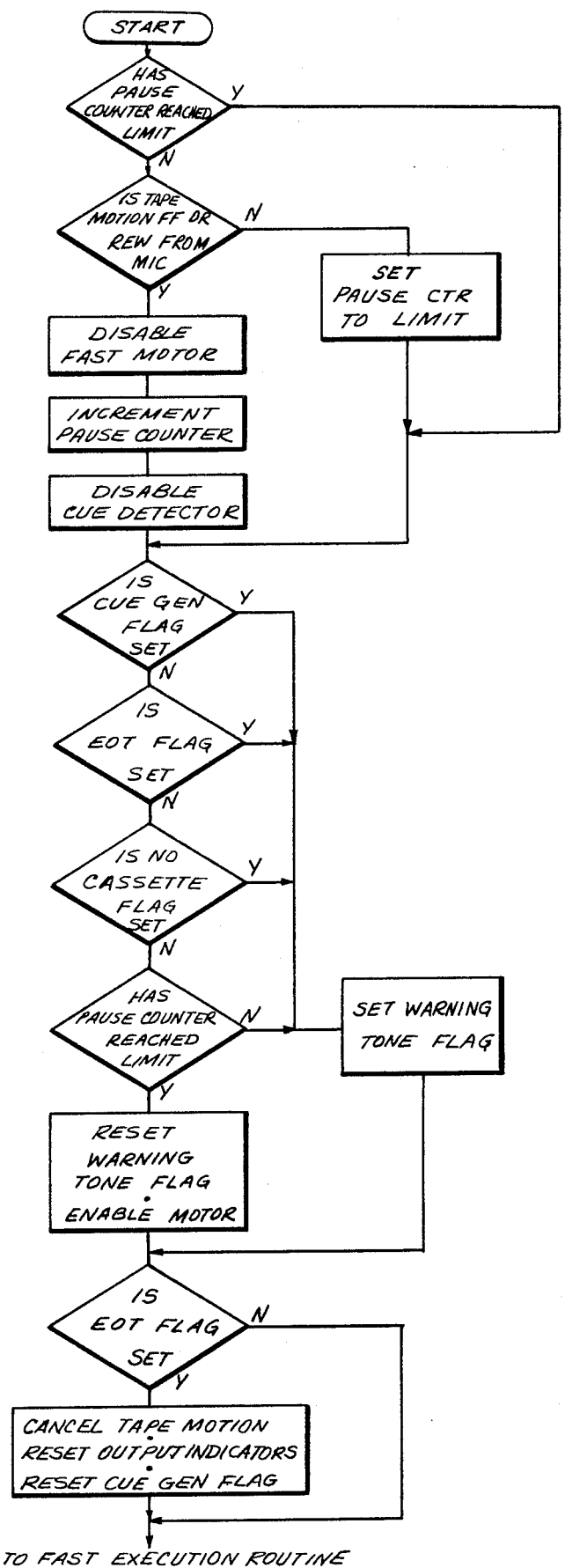
FIGS. 3 and 4 are flow charts showing, in greater detail, some of the routines carried out by the microprocessor.

Turning now to FIG. 3, a flow chart of the pause and warning tone routines is illustrated. The microprocessor is provided with a counter which is designated as the pause counter. Commencing from the START condition, inquiry is made as to whether this pause counter has reached a predetermined limit. If so, the programmed routine advances to the warning tone routine. However, if the count of this pause counter has not yet reached its predetermined limit, inquiry is made as to whether dictation/transcription machine 10 is in its "fast-forward" or "rewind" modes of operation, under the command of, for example, the microphone unit. If the answer to this inquiry is in the affirmative, such operation is interrupted temporarily by disabling the fast motor. Then, the pause counter is incremented by one count. Thus, if the count present in the pause counter had been less than the aforementioned predetermined limit, the count is incremented by one. However, if dictation/transcription machine 10 had not been disposed in its "fast-forward" or "rewind" modes, the pause counter is reset to its predetermined limit, and the programmed routine advances to the warning tone routine. Thus, machine 10 does not "pause" in its then-present operation.

After incrementing the count of the pause counter by one count, the cue detector circuit is disabled. As mentioned above, this circuit functions to detect cue signals which are reproduced from the magnetic tape when the tape is driven at its fast speed and, as will be described below, the detection of a cue signal, in certain modes of operation, results in resetting the pause counter to an initial count (not equal to its limit). The purpose of disabling the cue detector circuit is to prevent multiple detections of the very same cue signal after the fast motor is disabled and after this fast motor is re-enabled. After disabling the cue detector circuit, the programmed microprocessor exits from the pause routine and enters the warning tone routine. In this warning tone routine, inquiry is made as to whether a cue generator flag is set. The manner in which the cue generator flag is set is described hereinbelow with respect to FIG. 4. For the purpose of the present discussion, let it be assumed that the cue generator flag is set whenever cue switch 33 of microphone unit 12 is actuated, or whenever a cue signal is recorded under control of the telephone adapter (PIA). Thus, whenever a letter or instruction indicating signal is recorded, the cue generator flag is set. If this flag has been set, a warning tone flag is set. When the warning tone flag is set, a suitable warning indication, such as an audible warning tone, is generated. In addition, and if desired, a warning indicator lamp may be energized.

If the cue generator flag has not been set, inquiry is made as to whether the end-of-tape (EOT) flag has been set. This EOT flag is set whenever the microprocessor detects that the magnetic tape has been transported fully onto the take-up reel or fully onto the supply reel. For example, if motion is commanded, as when a microphone control switch or a keyboard control switch or the telephone adapter (PIA) is actuated to establish a mode of operation in which the tape is transported, but no tape movement is detected, as when successive chopper pulses (described above) are not produced, the EOT flag is set. If this EOT flag has been set, the warning tone flag is set. However, if this EOT flag has not been set, inquiry is made as to whether a no-cassette flag is set. This latter flag is set whenever a microphone switch or a keyboard switch commanding the recording or erasure of material has been actuated, but cassette compartment 20 remains empty. It is recalled that a suitable switch is provided in compartment 20 to detect the presence or absence of a cassette. If the no-cassette flag is set, thus indicating the absence of a cassette, the warning tone flag is set. However, if the no-cassette flag has not been set, inquiry then is made as to whether the pause counter has reached its aforementioned predetermined limit. If the pause counter has not yet reached its predetermined limit, the warning tone flag is set. However, once the pause counter has been incremented sufficiently so as to attain its predetermined limit count, the warning tone flag is reset and, moreover, the fast motor now is re-enabled. Consequently, the tape movement which had been interrupted is resumed. Typically, this tape movement is a fast-forward movement or a rewind movement, during which recorded cue signals are detected. As will be described below with respect to FIG. 7, the fast motor is disabled during the pause routine whenever a cue signal is detected while a "fast-forward" or a "rewind" mode of operation has been established in response to actuation of fast-forward switch 35 or rewind switch 37 of microphone unit 12. After the fast motor has been disabled for the time required for the pause counter to be incremented from zero to its predetermined limit count, this fast motor once again is enabled to resume the previously selected mode of operation. It may be appreciated that this "pause duration" is a function of the predetermined limit count of the pause counter and also the instruction clock rate. That is, this pause counter is incremented once during each program cycle. For example, if the program cycle has a period of 40 milliseconds, then this pause counter is incremented by one count every 40 milliseconds.

After the warning tone flag has been either set or reset in accordance with the flow chart shown in FIG. 3, the programmed routine advances to inquire whether the end-of-tape flag has been set. If so, and if a tape-motion switch (such as SEARCH switch 54, REWIND switch 56, FAST-FORWARD switch 58, SCAN switch 60, record lock switch 32, fast-forward switch 35, record switch 36, rewind switch 37, or one of the foot-pedal switches) has been closed, the following steps are carried out: all commanded tape motion is cancelled (i.e., a selected "record", "play", "rewind" or "fast-forward" mode of operation is terminated); the indicator lamp associated with the selected tape-motion switch is reset; and the cue generator flag, whether or not set, is reset. Thus, the microprocessor disposes dictation/transcription machine 10 in a quiescent mode, once the end-of-tape has been reached, awaiting remedial action by the operator, such as removal of the cassette, actuation of a rewind switch, or the like.

Figure 5:
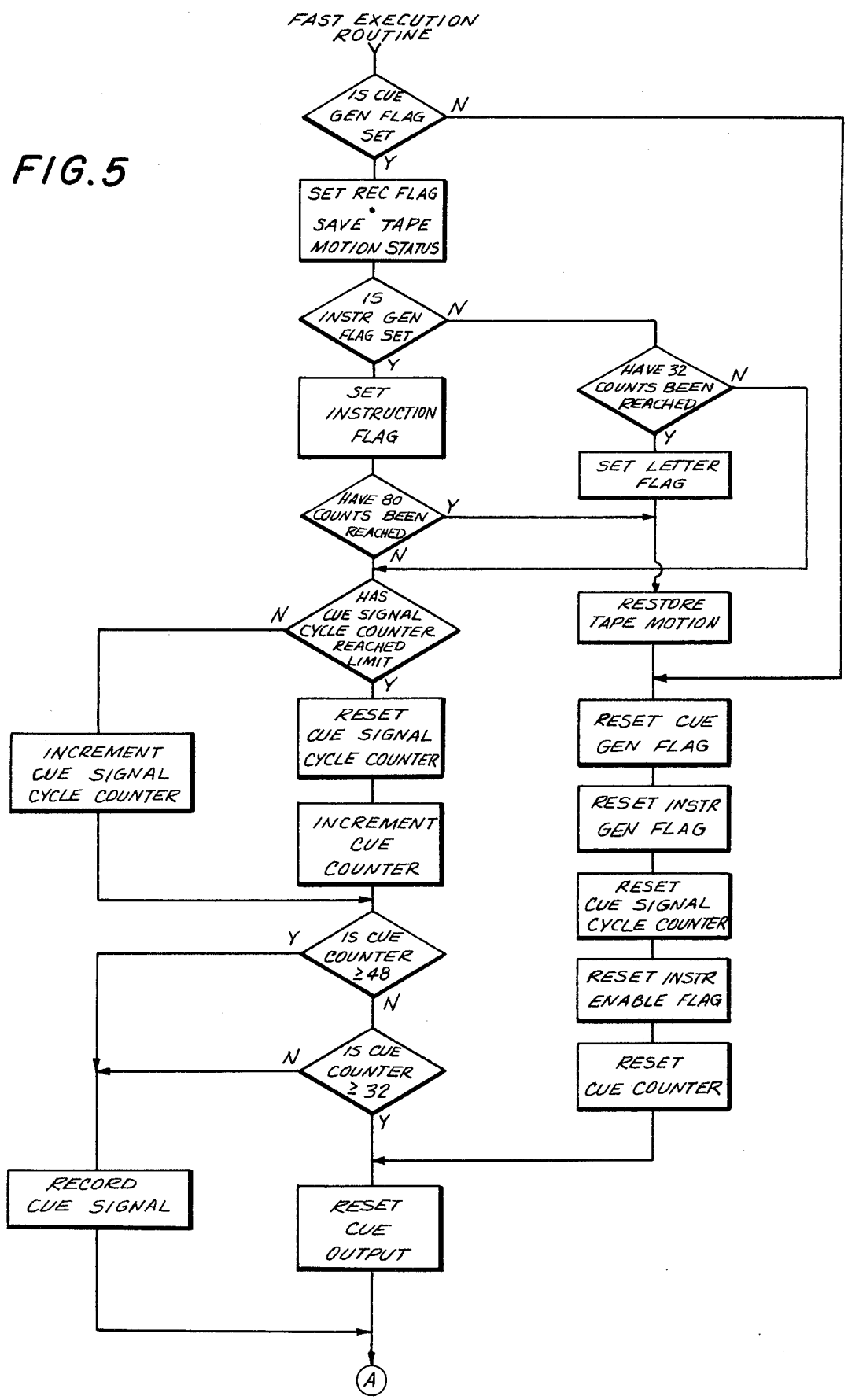
FIG. 5 illustrates the routine carried out by the microprocessor for recording letter and instruction cue signals.

After the commanded tape motion has been cancelled, the indicator lamps have been reset and the cue generator flag is reset, the programmed routine advances to the fast execution routine. This fast execution routine includes the aforementioned end zone and end-of-tape subroutines. Since these subroutines form no part of the present invention per se, further description thereof is omitted. Suffice it to say that, after these subroutines are performed, in the sequence indicated, the fast execution routine advances to the cue generator routine, the flow chart of which is illustrated in FIG. 5.

Before describing the cue generator routine, reference is made to the overall flow chart shown in FIG. 2. As discussed above, all of the indicated routines are performed by the microprocessor once each cycle; and the fast execution routine is carried out a predetermined number of times (e.g. eight times) during that cycle. Of course, during one program cycle, the keyboard switch routine is performed, followed by the microphone switch routine. Since the conditions sensed by these latter routines are used in the cue generator and cue detect routines, pertinent portions of the keyboard and microphone switch routines first will be described.

Figure 4:
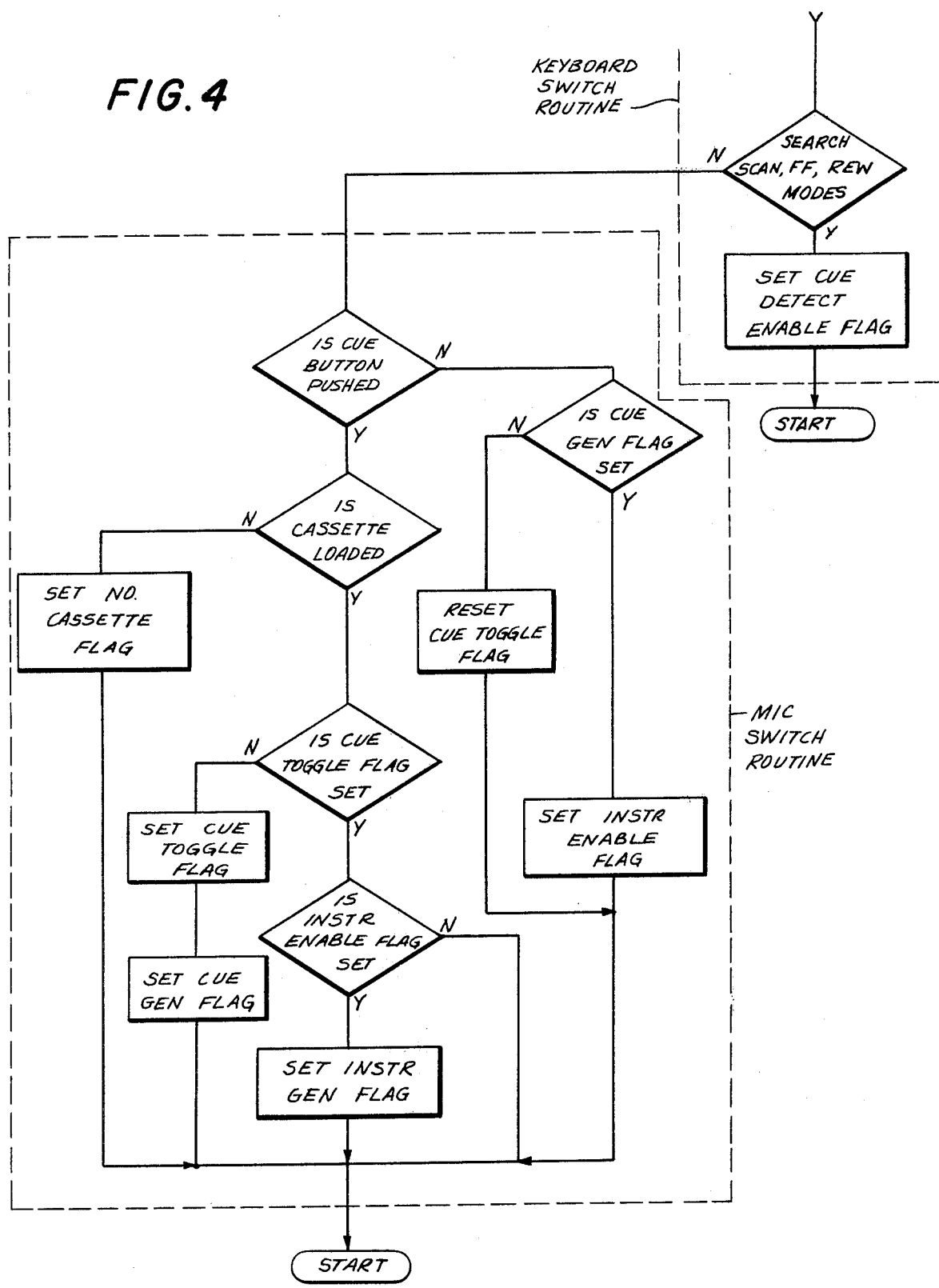

Turning now to FIG. 4, during the keyboard switch routine, inquiry is made as to whether dictation/transcription machine 10 is disposed in its "search", "scan", "fast-forward" or "rewind" modes, as in response to the actuation of SEARCH switch 54, or SCAN switch 60, or fast-forward switch 35 (on microphone 12) or rewind switch 37. If so, a cue detect enable flag is set, and the programmed microprocessor returns to its START condition (from which the routines decribed above with respect to FIGS. 2 and 3 are carried out). It will be described below, in conjunction with the cue detect subroutine, that the setting of the cue detect enable flag permits the detection of each reproduced cue signal.

If the inquiry as to whether dictation/transcription machine 10 is disposed in its "search", "scan", "fast-forward" or "rewind" mode is answered in the negative, the programmed routine advances to the microphone switch routine. During the microphone switch routine, inquiry is made as to whether cue switch 33 is in the process of being actuated. If not, inquiry next is made as to whether the cue generator flag has been set. If this cue generator flag has been set, an instruction enable flag is set; and the programmed routine advances to the START condition. However, if the cue generator flag has not been set, a cue toggle flag is reset, and then the programmed routine advances to the START condition.

If the inquiry as to whether cue switch 33 is in the process of being actuated is answered in the affirmative, inquiry next is made as to whether a cassette is loaded in cassette compartment 20. If not, the no-cassette flag (described above with respect to the warning tone routine shown in FIG. 3) is set. However, if a cassette is, in fact, loaded into cassette compartment 20, inquiry next is made as to whether the cue toggle flag has been set. If not, the cue toggle flag then is set and the cue generator flag also is set. The programmed routine then advances to the START condition. However, if the cue toggle flag already has been set, inquiry is made as to whether the instruction enable flag is set. If the answer to this inquiry is in the negative, the programmed routine advances to the START condition. But if the answer to this inquiry is in the affirmative, then the instruction generator flag is set, and the programmed routine advances to the START condition. The overall routine shown in FIG. 2 is, of course, carried out, commencing from the START condition, during each program cycle.

It should be understood that only portions of the keyboard and microphone switch routines are illustrated in FIG. 4. The portions shown herein are useful in understanding the operation of the cue generator and cue detect subroutines, and are not intended to be construed as representing the complete switch routines. The respective flags which are set by the illustrated portions of the keyboard and microphone switch routines are utilized by the cue generator and detect subroutines, as will now be described.

Turning to FIG. 5, it is assumed that the illustrated cue generator subroutine is carried out once during each performance of the fast execution routine. In this cue generator subroutine, inquiry first is made as to whether the cue generator flag is set. If this flag is not set, for example, cue switch 33 has not been actuated, the programmed routine jumps to the sequence of instructions whereby the cue generator flag is reset, the instruction generator flag is reset, a cue signal cycle counter is reset, an instruction enable flag is reset, a cue counter is reset, and the cue output is reset. The cue signal cycle counter is a counter provided in the microprocessor, which counter is supplied with pulses that are generated in synchronism with the instruction clock rate, as will be described. When this cue signal cycle counter attains a predetermined limit count, which differs from the aforedescribed predetermined pause limit count, the cue signal counter is reset. Thus, reset signals will be produced periodically. These reset signals are used to change over the phase of an output signal. For example, in response to each reset signal, a flip-flop circuit, such as a JK flip-flop circuit, is triggered to change state. If the output produced by the flip-flop circuit is considered to be the output signal, it is appreciated that the phase, or state, of this output signal is changed over, or reversed, at each reset signal. One complete cycle of the output signal thus is produced in response to every two reset signals. As will be described below, this output signal, whose phase, or state, changes over in response to each reset signal, is used as the oscillating cue signal. As one example thereof, the frequency of this output signal may be equal to 15 Hz.

The cue counter is adapted to be incremented in synchronism with the instruction clock pulses. More particularly, and as will be described, the count of the cue counter is incremented by one count each time that the cue signal cycle counter is reset. The cue counter, which may be yet another counter included within the microprocessor, is adapted to be incremented until a predetermined count is attained. If the cue generator flag has not been set, this cue counter is reset to an initial count, such as a count of zero.

When the cue output is reset, further recording of a cue signal is inhibited until the cue generator flag is set once again.

If the inquiry as to whether the cue generator flag has been set is answered in the affirmative, that is, cue switch 33 had been actuated, the record flag is set and the status of the tape motion is stored. The record flag normally is produced when record-lock switch 32 or record switch 36 on microphone unit 12 is actuated. The setting of the record flag initiates the "record" mode of operation. Thus, when the cue generator flag is set, the "record" mode is initiated to record the cue signal. Furthermore, by storing the status of the tape motion, the various tape motion flags are retained. For example, if the tape had been driven when dictation/transcription machine 10 is in its "record-lock" mode, the record-lock flag, representing this particular type of tape motion, will be strored. If the tape had been stopped prior to the setting of the cue generator flag, that is, prior to the actuation of cue switch 33, an indication of no tape motion will be stored. By saving the status of the tape motion flags, the immediately preceding mode of operation can be restored after the cue signal is recorded.

After setting the record flag and storing the status of the tape motion flags, inquiry is made as to whether the instruction generator flag has been set. This flag is set (shown in FIG. 4) only if cue switch 33 is re-actuated (to record the instruction indicating signal) prior to the time that the cue counter has attained a predetermined count. The setting of the instruction generator flag represents that the instruction indicating signal is to be recorded. If this instruction generator flag has been set, the instruction flag is set and then inquiry is made as to whether the cue counter has attained a count of "80". If the instruction generator flag has not been set, inquiry is made as to whether the cue counter has attained a count of "32". If the count of 32 is attained, the letter flag is set. Following the setting of the letter flag, or if the cue counter has attained a count of 80, the preceding tape motion is restored. That is, the tape motion represented by the stored status of the tape motion flags is resumed. If dictation/transcription machine 10 had been disposed in its "record-lock" mode immediately prior to the actuation of cue switch 33, that is, immediately prior to the setting of the cue generator flag, then, after the cue counter has attained a count of 80 or 32, depending upon whether the instruction generator flag has been set, and after the instruction or letter flag is set, the "record-lock" mode is restored. Similarly, if the dictation/transcription machine had been disposed in its "stop" mode, this mode is restored. Then, and as illustrated in FIG. 5, the cue generator flag is reset, the instruction generator flag is reset, the cue signal cycle counter is reset, the instruction enable flag is reset, the cue counter is reset and the cue output is reset.

If the instruction generator flag has been set but the cue counter has not yet reached the count of 80; or if the instruction generator flag has not been set but the cue counter has not yet reached its count of 32, inquiry next is made as to whether the cue signal cycle counter has reached its predetermined limit. For purposes of the present discussion, let it be assumed that this predetermined limit is equal to a count of 6. If the cue signal cycle counter has not yet reached this count of 6, it is incremented by one count. Then, inquiry is made as to whether the count of the cue counter is greater than, or equal to, the count of 48. If not, inquiry is made as to whether the count of the cue counter is greater than, or equal to, a count of 32. If the count of the cue counter is less than 32 or greater than 48, a cue signal is recorded. That is, the output signal whose phase, or state, is changed in response to each resetting of the cue signal cycle counter, is recorded. However, if the count of the cue counter is between 32 and 48, the cue output is reset.

If the inquiry as to whether the cue signal cycle counter has reached its predetermined limit is answered in the affirmative, that is, if the cue signal cycle counter has been incremented to a count of, for example, 6, the cue signal cycle counter than is reset and the cue counter is incremented by one count. Then, inquiry is made as to whether the count of the cue counter is less than 32, or between 32 and 48, or greater than 48. Depending upon the answer to this inquiry, the cue signal either is recorded or the cue output is reset. Then, the programmed routine advances to the cue detect subroutine, shown in FIG. 7, and described below.

From the foregoing, it is appreciated that the cue signal cycle counter is incremented once during each cycle of the fast execution routine. That is, each time the cue generate subroutine is carried out, the cue signal cycle counter is incremented. The fast execution routine is carried out once every 5 milliseconds. Thus, the cue signal cycle counter, which is incremented in synchronism with the instruction clock rate, is incremented at the rate of once every 5 milliseconds. The instruction clock signal which is used to increment the programmed routine is illustrated in FIG. 6A.

In the foregoing discussion, it has been assumed that the predetermined limit count of the cue signal cycle counter is equal to a count of six. Hence, after the cue signal cycle counter has been incremented six times, it is reset. Since the cue signal cycle counter is incremented once every 5 milliseconds, the cue signal cycle counter is reset at the rate of once very 30 milliseconds, as shown in FIG. 6B. The phase, or state, of the output signal, such as produced by a J-K flip-flop circuit, is changed, or reversed, in response to each reset pulse shown in FIG. 6B. The resultant output signal thus appears as the cue signal shown in FIG. 6C. The frequency of this cue signal is approximately 15 Hz. It should be appreciated that the specific frequency of the cue signal is not critical, and may be selected as desired. It merely is sufficient that this frequency lie well below the voice frequency band such that it is not perceived when audio signals recorded on the magnetic tape are reproduced. Also, the cue signal frequency should be such as to be readily detected, such as by a filter, or the like, when the tape is transported at its fast speed.

As mentioned above, each time that the cue signal cycle counter is reset, the cue counter is incremented by one count. Thus, the cue counter may be thought of as counting the reset pulses by which the cue signal cycle counter is reset. When the count of this cue counter is less than 32, the cue signal is recorded. However, when this count of 32 is attained, the cue output is reset, as shown in FIG. 6D, thus interrupting the recording of the cue signal.

The cue counter continues to increment, and when the count thereof attains the count of 48, the cue signal is recorded once again. FIG. 6D represents the envelope of a letter indicating signal which, as illustrated, is at a relatively higher voltage level when the cue counter is incremented from a count of 1 to a count of 32. FIG. 6E represents the envelope of the instruction indicating signal which, as illustrated, is at its relatively higher voltage level when the count of the cue counter is incremented from a count of 1 to a count of 32. Then, while the cue counter is incremented from a count of 32 to a count of 48, the instruction indicating signal envelope returns to its relatively lower level. The cue signal is not recorded during this interval. When the count of the cue counter attains the count of 48, the instruction indicating signal envelope once again returns to its relatively higher level and remains thereat until the cue counter attains the count of 80.

In operation, it is appreciated that the microprocessor cycles through its programmed routine, illustrated broadly in FIG. 2. During one cycle, the fast execution routine is performed a predetermined number of times (e.g. eight times), and the keyboard and microphone switch routines (portions of which are shown in FIG. 4), are performed once. Let it now be assumed that cue switch 33 is actuated in order to record a letter indicating signal. Hence, when the microphone switch routine is carried out, the inquiry as to whether the cue switch is actuated (FIG. 4) is answered in the affirmative. It also is assumed that a cassette is properly loaded in compartment 20 of machine 10. Now, since this is the initial actuation of the cue switch, the inquiry as to whether the cue toggle flag has been set is answered in the negative. Accordingly, the cue toggle flag now is set and the cue generator flag is set. The microprocessor then returns to its START condition; and eventually, enters the fast execution routine. In carrying out the fast execution routine, the cue generator subroutine is performed. As shown in FIG. 5, since the cue generator flag is set, by reason of the actuation of cue switch 33, the record flag is set. The status of the tape motion flags is stored, and it is assumed that the tape had been stopped. Hence, the status of this stopped condition is stored.

Next, the inquiry as to whether the instruction generator flag has been set is answered in the negative. At the present time, since the cue switch now is actuated initially, the cue counter exhibits a count of zero. Consequently, the inquiry as to whether the counter has attained a count of 32 is answered in the negative. Also, it is assumed that the cue signal cycle counter commences from its reset initial count of zero. Thus, the cue signal cycle counter has not yet reached its predetermined limit count and, therefore its count is incremented by one. The count of the cue counter, which is assumed to be zero, is not greater that 48, nor is it greater than 32. Thus, the cue signal now is recorded.

The remainder of the fast execution routine is carried out, and then the programmed microprocessor returns to carry out the fast execution routine once again. In the course of this routine, the programmed microprocessor advances to the beginning of the flow chart shown in FIG. 5. It is assumed that the cue switch still is in the process of being actuated. This assumption is accurate when it is recognized that the fast execution routine is carried out every 5 milliseconds. It is realistically assumed that the cue switch is actuated for a sufficient period of time greater that 5 milliseconds. The inquiry as to whether the cue generator flag has been set is answered in the affirmative. This is because the cue generator flag, which had been set in response to the initial actuation of the cue switch, had not been reset. The record flag, which has been set, remains set and the status of the tape motion flags still is stored. Since the instruction generator flag is not set, inquiry again is made as to whether the count of the cue counter has reached a count of 32. In accordance with the example now being described, the count of the cue counter still is assumed to be zero. Hence, this inquiry is answered in the negative.

The next-following inquiry of whether the cue signal cycle counter has reached its predetermined limit, also is answered in the negative. Consequently, the cue signal cycle counter is incremented once again, and since the count of the cue counter remains less that 32, the recording of the cue signal continues.

The programmed routine then continues through the fast execution routine, as discussed above. Then, 5 milliseconds later, as the fast execution routine is carried out once again, the foregoing steps constituting the cue generator subroutine are performed once again. It is appreciated that, as the cue generator subroutine is repeated, the cue signal cycle counter is incremented. Finally, during the sixth repetition of the cue generator subroutine following the actuation of the cue switch, the cue signal cycle counter is incremented to a count of 6. When, the fast execution routine is carried out once again, the inquiry as to whether the cue signal cycle counter has reached its predetermined limit is answered in the affirmative. Hence, the cue signal cycle counter is reset to its initial count, for example, a count of zero, and the cue counter is incremented. Still, the count of the cue counter, which now is assumed to be equal to a count of 1, is less than 32. Hence, the cue signal continues to be recorded.

As the fast execution routine continues to be carried out every 5 milliseconds, the cue generator subroutine likewise is carried out every 5 milliseconds. Of course, the overall microprocessor routine, shown in FIG. 2, is carried out every 40 milliseconds. Let it be assumed that, at some time prior to the cue counter attaining its count of 32, the operator releases cue switch 33. Then, during the next cycling of the microprocessor through the microphone switch routine, when that portion shown in FIG. 4 is carried out, the inquiry as to whether the cue switch is actuated (shown in the flow chart of FIG. 4) is answered in the negative. The cue generator flag remains set, however, and, therefore, the instruction enable flag is set. When the programmed routine advances to the fast execution routine, and particularly to the flow chart shown in FIG. 5, the inquiry as to whether the cue generator flag is set is answered in the affirmative, and the record flag remains set. Next, the inquiry as to whether the instruction generator flag has been set is answered in the negative, but it is assumed that the cue counter has not yet reached its count of 32. Accordingly, the cue signal cycle counter continues to be incremented until it reaches its predetermined limit count (e.g. 6). Of course, once this limit has been attained, the cue signal cycle counter is reset and the cue counter is incremented. These steps are repeated through each cycle of the fast execution routine.

If it is assumed that cue switch 33 is not reactuated, the aforedescribed cue generator subroutine is repeated once during each cycle of the fast execution routine, that is, once every 5 milliseconds.

It is seen that, eventually, as the cue counter is incremented, it will attain a count of 32. When the fast execution routine, and particularly, the cue generator subroutine next is carried out, the inquiry as to whether the cue generator flag is set is answered in the affirmative, and the record flag remains set. Next, the inquiry as to whether the instruction generator flag has been set again is answered in the negative. Now, the inquiry as to whether the cue counter has attained a count of 32 is answered in the affirmative. Thus, the letter flag is set. Then, the tape motion which has been present prior to the actuation of the cue switch is restored. The cue generator flag then is reset; the instruction generator flag (which, in the present example, had not been set) is reset; the cue signal cycle counter is reset to its initial count; the instruction enable flag is reset; the cue counter is reset to its initial count; and the cue output is reset. Thus, a single burst of cue signal is recorded, this burst being recorded for an interval equal to the time required for the cue counter to attain a count of 32, as shown in FIG. 6D. Since the cue counter is incremented once every 30 milliseconds (the time required for the cue signal cycle counter to attain its count of 6), the burst of cue signal which constitutes the letter indicating signal is recorded for an interval equal to $32 \times 30$, or 960 milliseconds. During this interval, sixteen cycles of the cue signal are recorded.

After the letter indicating signal is recorded, the microprocessor continues to carry its programmed routine and, thus, carries out the microphone switch routine periodically. Returning to the flow chart shown in FIG. 4, the inquiry as to whether the cue switch is actuated is answered in the negative, and the inquiry as to whether the cue generator flag is set likewise is answered in the negative. It is recalled that the cue generator flag had been reset after the letter flag had been set. Thus, the cue toggle flag, which had been set when the cue switch initially had been actuated, now is reset. When the programmed routine advances to the fast execution routine, and particularly to the flow chart shown in FIG. 5, the inquiry as to whether the cue generator flag is set is answered in the negative. The next-following instructional steps have been described above and, in the interest of brevity, need not be repeated.

In the foregoing example, it has been assumed that the cue switch is not re-actuated, thus resulting in the recording of the letter indicating signal. Let it now be assumed that, prior to the time that the cue counter is incremented to a count of 32, the cue switch is re-actuated. When the programmed microprocessor next performs the microphone switch routine, the inquiry as to whether the cue switch is in the process of being actuated (FIG. 4) now will be answered in the affirmative. Following the flow chart of FIG. 4, it is appreciated that a cassette is loaded in dictation/transcription machine 10, the cue toggle flag remains set (this flag is reset if the cue switch is not actuated and the cue generator flag is not set) and the instruction enable flag has been set. It is recalled that this instruction enable flag had been set after the cue switch had been deactuated. Next, the instruction generator flag is set.

During the normal course of its programmed routine, the microprocessor advances to its fast execution routine, and particularly, the cue generator subroutine shown in FIG. 5. The inquiry as to whether the cue generator flag is set is, of course, answered in the affirmative; and the inquiry as to whether the instruction generator flag has been set now is answered in the affirmative. Hence, the instruction flag now is set. Inquiry now is made as to whether the cue counter has attained the count of 80. In accordance with the present example, it has been assumed that the cue switch is reactuated prior to the time that the cue counter reaches the count of 32. Hence, the inquiry as to whether the cue counter has attained the count of 80 is answered in the negative. If the cue signal cycle counter has not reached its predetermined limit count of, for example, 6, this counter is incremented and the fast execution routine is continued. Of course, once the cue signal cycle counter has been incremented to its predetermined limit count, it is reset and, moreover, the cue counter is incremented by one count.

During each cycle of the cue generator subroutine, inquiry is made as to whether the count of the cue counter lies between 32 and 48. Once the cue counter has been incremented to the count of 32, recording of the cue signal is interrupted, and the cue output is reset to its initial count. As shown in FIG. 6E, when the cue counter attains the count of 32, the first burst of cue signal is completed.

Since the cue switch has been re-actuated prior to the time that the cue counter reaches the count of 32, the instruction generator flag is set, and the cue counter continues to be incremented beyond the count of 32. Furthermore, the cue signal cycle counter continues to be incremented once during each execution of the cue generator subroutine, that is, once every 5 milliseconds. As before, when the cue signal cycle counter reaches its predetermined limit count of, for example, 6, it is reset, and the cue counter is incremented. Nevertheless, even as the cue counter is incremented, the cue signal is not recorded during the interval that the count of this cue counter increases from the count of 32 to the count of 48. Eventually, the cue counter is incremented to the count of 48 (it is appreciated that this occurs 16×30=480 milliseconds following the time that the recording of the cue signal is interrupted). Once this count of 48 is reached, the inquiry as to whether the count of the cue counter is equal to or greater than 48 is answered in the affirmative (FIG. 5). Hence, the cue signal is recorded once again.

As the fast execution routine is repeated, the cue generator subroutine is carried out in the aforedescribed manner. The cue signal cycle counter continues to be incremented at the rate at which the cue generator subroutine is carried out (every 5 milliseconds) and when the predetermined limit count of, for example, 6, is reached, the cue signal cycle counter is reset and the cue counter is incremented. Thus, the cue counter continues to be incremented at the rate of one count every 30 milliseconds. This incrementing of the cue counter continues until it reaches the count of 80. At that time, when the cue generator subroutine next is carried out, the inquiry as to whether the cue counter has reached the count of 80 is answered in the affirmative (FIG. 5). Accordingly, the tape motion which existed prior to the initial actuation of cue switch 33 is restored. In the present example, it has been assumed that, prior to actuating cue switch 33, dictation/transcription machine 10 had been disposed in its "stop" mode. Thus, this mode of operation is restored. Then, the cue generator, instruction generator and instruction enable flags all are reset, as are the cue signal counter and the cue counter. Also, the cue output is reset. The cue generator subroutine now is returned to a "ready" condition, and is prepared to respond to the next actuation of the cue switch, as detected by the microphone switch routine.

The resultant indicating signal which is recorded when the cue switch is iteratively actuated in the manner described above, is illustrated in FIG. 6D. It is seen that two successive bursts of cue signal are recorded, the first burst being recorded when the cue counter is incremented from the count of zero to the count of 32, and the second burst being recorded when the cue counter is incremented from the count of 48 to the count of 80. In recording the instruction indicating signal, the cue switch is deactuated and then re-actuated prior to the time that the cue counter attains the count of 32. Thus, the cue switch should be actuated, deactuated and then reactuated, all within a period of 32×30=960 milliseconds, in order to record the instruction indicating signal. The duration over which cue switch 33 is re-actuated does not affect the recording of the instruction indicating signal. Thus, even if this cue switch is only momentarily reactuated, the cue generator subroutine will detect this reactuation, provided that such momentary reactuation subsists for a minimum of 40 milliseconds (the program cycle time for the microprocessor).

If the cue switch is not deactuated prior to the time that the cue counter reaches its count of 32, it is seen that the instruction enable flag (FIG. 4) will not be set at the time that the cue counter reaches this count. Thus, the instruction generator flag cannot be set and, even though the cue switch still may be actuated, once the cue counter attains the count of 32, the letter flag is set (FIG. 5). If the cue switch now is deactuated and then re-actuated, a second burst of cue signal will be recorded, but this second burst will be spaced from the first burst by more than 16 counts of the cue counter. Thus, the cue signals will be recorded as two successive indicating signals, rather than as an instruction indicating signal. The letter flag, representing the recording of the letter indicating signal, will be set in response to each such actuation of the cue switch. It is clear that the instruction flag, representing the recording of the instruction indicating signal, is set only if the cue switch is re-actuated prior to the time that the cue counter reaches the count of 32.

If desired, the cue generator subroutine may be modified such that the recording of the cue signal is terminated when the cue counter reaches the count of 32, but the letter flag is not set until the cue counter is further incremented to the count of 48. This provides additional time for the user to reactuate the cue switch, and thus record the instruction indicating signal.

From the flow chart shown in FIG. 5, it is appreciated that, after the recording of a letter or instruction indicating signal, the cue signal cycle counter and the cue counter both remain reset at their initial count of, for example, zero. From FIG. 4, it is recognized that if the dictation/transciption machine is not disposed in its "search", "scan", "fast-forward" or "rewind" mode, and if the cue switch is not actuated, then the cue generator flag is not set. In the absence of the cue generator flag, the cue toggle flag remains reset and, proceeding to the flow chart of the cue generator suubroutine, shown in FIG. 5, the cue generator, instruction generator and instruction enable flags all remain reset. Also, the cue signal cycle counter and cue counter both remain reset; and the cue output remains reset.

Let it now be assumed that the dictation/transcription machine has been disposed in an operating mode in response to the actuation of fast-forward switch 35 or rewind switch 37, both provided on microphone unit 12, or in response to the actuation of SEARCH switch 54 or SCAN switch 60, both provided as keyboard switches. When the microprocessor carries out its keyboard switch routine, the cue detect enable flag is set as shown in FIG. 4. In the "search" or "scan" modes, or in the "fast-forward" or "rewind" modes initiated by the actuation of the control switches provided on microphone unit 12, cue signals which are recorded as either letter or instruction indicating signals are detected and utilized in the manner now described.

Figure 7:
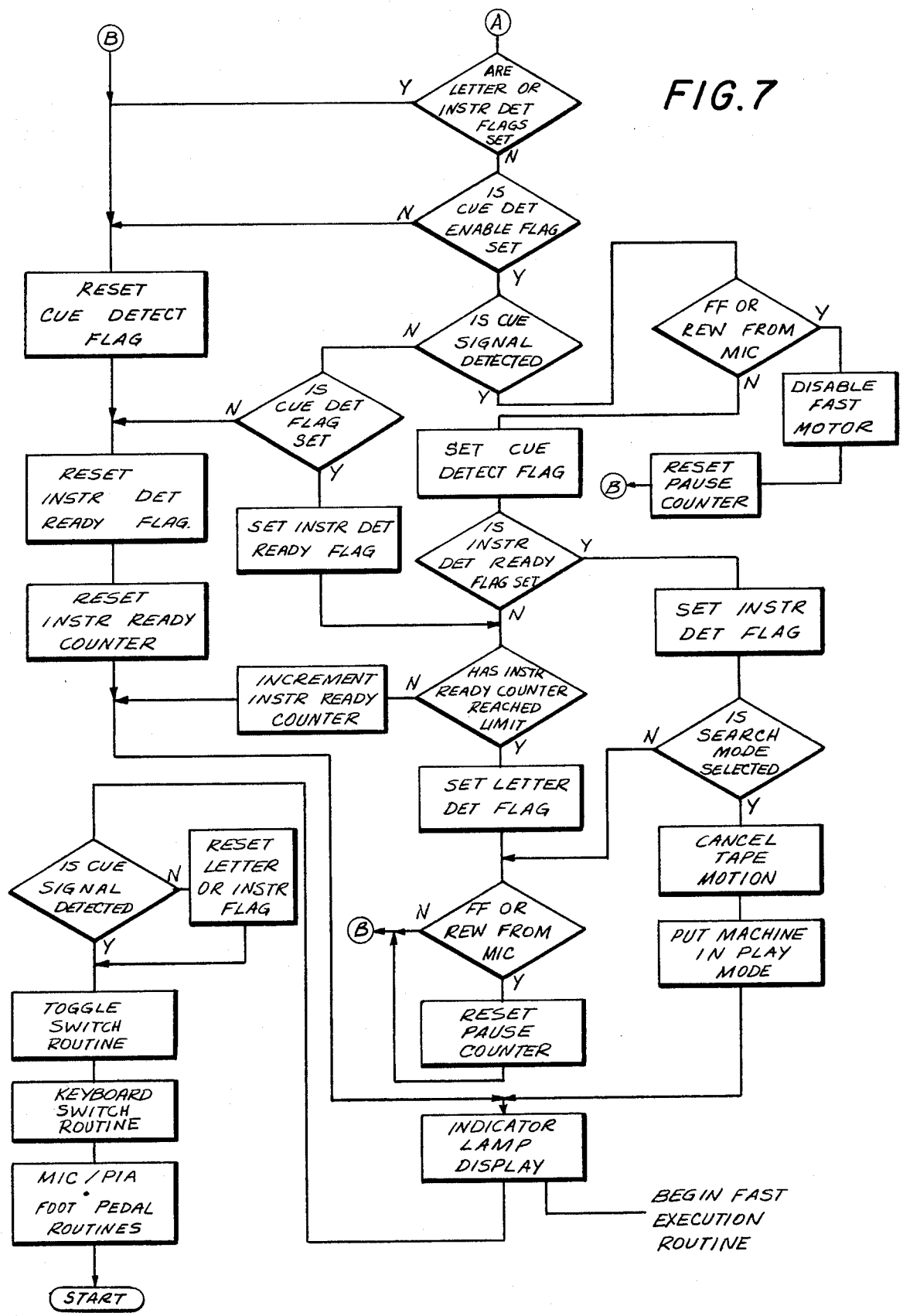
FIG. 7 is a flow chart illustrating the manner in which the microprocessor detects cue signals reproduced from the record medium used in the dictation/transcription machine.

After setting the cue detect enable flag, the programmed routine returns to the START condition, and the respective routines represented in FIG. 2 are performed. When the fast execution routine is carried out, the cue detect subroutine, shown in FIG. 7, is performed as a part of this fast execution routine. In this subroutine, inquiry is made as to whether the letter or instruction detecting flags have been set. As will be described below, these flags are set after the letter indicating signal (FIG. 6D) or instruction indicating signal (FIG. 6E), respectively, is detected. Also, the setting of these flags indicates that the appropriate indicating signal has been detected, and the various parameters which are established in order to carry out such detection now can be reset. Thus, if this inquiry is answered in the affirmative, a cue detect flag is reset, an instruction detect ready flag is reset and an instruction ready counter also is reset to an initial count, such as zero. As will be described, the cue detect flag is set if a cue signal is detected. The instruction detect ready flag is set when the detected cue signal terminates. The instruction ready counter is incremented if the cue detect flag has been set.

If the inquiry as to whether the letter or instruction detect flags have been set is answered in the negative, inquiry next is made as to whether the cue detect enable flag is set. As mentioned above, this flag is set during the keyboard switch routine (FIG. 4) if dictation/transcription machine 10 is disposed in the "search", "scan", "fast-forward" (microphone-initiated) or "rewind" (microphone-initiated) mode of operation. If this cue detect enable flag is not set, the cue detect flag is reset, as are the instruction detect ready flag and the instruction ready counter. However, if the cue detect enable flag is set, inquiry is made as to whether a cue signal is in the process of being detected. If the answer to this inquiry is in the negative, inquiry next is made as to whether the cue detect flag has been set. If not, the instruction detect ready flag and the instruction ready counter both are reset. If the cue detect flag has been set, then the instruction detect ready flag now is set and inquiry next is made as to whether the instruction ready counter has reached a preselected limit count.

If the cue signal is in the process of being detected, inquiry is made as to whether the dictation/transcription machine 10 is disposed in the "fast-forward" or "rewind" modes, as initiated from microphone unit 12. If not, then it is assumed that the dictation/transcription machine is disposed either in its "search" or "scan" modes, and the cue detect flag then is set. Following the setting of the cue detect flag, inquiry is made as to whether the instruction detect ready flag has been set. If not, inquiry is made as to whether the instruction ready counter has reached its preselected limit count.

If the cue signal is detected while dictation/transcription machine 10 is disposed in its "fast-forward" or "rewind" modes, as initiated from the microphone unit, the fast motor, which operates in these modes, is disabled. Also, the pause counter is reset to an initial count, such as zero. It is recalled, from the description of the pause routine discussed above with respect to FIG. 3, the pause counter normally remains at its predetermined limit count. After resetting the pause counter, the cue detect and instruction detect ready flags are reset, as is the instruction ready counter.

If the instruction detect ready flag has been set, an instruction detect flag is set which, as will be described below, represents that an instruction indicating signal has been detected. Furthermore, the instruction detect flag may be utilized to provide a suitable indication on index/instruction display 24 (FIG. 1) representing the relative location of instructional information recorded on the magnetic tape. Next, inquiry is made as to whether the dictation/transcription machine is disposed in its "search" mode. If so, this mode is terminated, that is, all tape motion is cancelled, and the machine then is disposed in its "play" mode. The programmed microprocessor then exits from the fast execution routine to carry out the indicator lamp display routine.

If the inquiry as to whether the instruction detect ready flag has been set is answered in the negative, the instruction detect flag is not set, and inquiry next is made as to whether the instruction ready counter has reached its preselected limit count. If this last inquiry is answered in the negative, the instruction ready counter is incremented by one count, and the programmed microprocessor exits from the fast execution routine to perform the indicator lamp display routine. However, if the instruction ready counter has reached its preselected limit count, the letter detect flag is set to represent the detection of the letter indicating signal. This letter detect flag may be used to provide a suitable indication on index/instruction display 24 of the relative location along the magnetic tape at which the letter indicating signal is recorded. Then, inquiry is made as to whether this letter detect flag has been setwhile dictation/transcription machine 10 is disposed in its "fastfoward" or "rewind" mode, as derived from microphone unit 12. It is seen that this inquiry also is made in the event that the instruction detect flag has been set and it is determined that the machine is not disposed in its "search" mode (that is, the instruction detect flag has been set while the machine is disposed in its "scan" mode). If the letter or instruction detect flags have been set while dictation/transcription machine 10 is disposed in its "fast-forward" or "rewind" modes, the pause counter is reset, and then the cue detect and instruction detect ready flags as well as the instruction ready counter, all are reset. However, if the letter or instruction detect flags are set while dictation/transcription machine 10 is not disposed in its "fast-foward" or "rewind" modes, the foregoing flags and counter are reset but the pause counter is not reset.

As illustrated in FIG. 7, the fast execution routine exits to the indicator lamp display routine. As has been described above, after the indicator lamp display routine is carried out, the programmed microprocessor returns to carry out another cycle of the fast execution routine. After the programmed microprocessor cycles through a predetermined number of fast execution and indicator lamp display routines, that is, after these routines are repeated eight times, the programmed microprocessor advances to inquire as to whether a cue signal is in the process of being detected. If not, then the letter or instruction flag is reset, and the programmed microprocessor advances to the toggle switch routine. However, if the cue signal still is in the process of being detected, the letter or instruction flag is not reset, and the programmed microprocessor advances to the toggle switch routine. It is recalled that, after the toggle switch routine is performed, the keyboard switch routine is carried out and then the microphone switch routine is executed. The programmed microprocessor then returns to its START condition to carry out the pause routine, followed by the warning tone routine, and then a predetermined number of cycles of the fast execution and indicator lamp display routines.

The manner in which the cue detect subroutine functions in various modes to detect instruction and letter indicating signals which are recorded on the magnetic tape now will be described. It is appreciated that the letter and instruction indicating signals are recorded by a suitable transducer which, if desired, may be separate and distinct from the primary record/playback head which is used to record audio information or, alternatively, may constitute the same transducer. This indicating signal recording transducer also may be used to reproduce the letter and instruction indicating signals from the magnetic tape as that tape is transported at its fast speed. Suitable cue signal detecting circuitry, such as described in U.S. Pat. No. 4,200,893 also may be provided to produce an output signal, such as a voltage level representing a binary "1", in response to the reproduction of each burst of cue signal. This voltage level represents that a cue signal has been detected.

Initially, let it be assumed that dictation/transcription machine 10 is disposed in its "scan" mode. It is recalled that, in this mode of operation, the fast motor is energized to drive the magnetic tape in the reverse direction at fast speed. Furthermore, cue signals, which are recorded as letter or instruction indicating signals, are reproduced from the magnetic tape. The programmed microprocessor caries out the routines illustrated in FIG. 2, and during the keyboard switch routine, the cue detect enable flag is set. After setting the cue detect enable flag, the microprocessor advances to its START condition. Of course, during the next cycle of the microprocesssor, the fast execution routine and particularly the cue detect subroutine is carried out. As shown in FIG. 7, inquiry first is made as to whether the letter or instruction detect flag has been set. In the present example, it is assumed that neither of these flags has been set and, therefore, inquiry next is made as to whether the cue detect enable flag has been set. Since the dictation/transcription machine is assumed to be disposed in its "scan" mode, this cue detect enable flag is set. If a cue signal is not in the process of being detected, and if the cue detect flag has not been set, then the instruction detect ready flag and instruction ready counters both are reset. In the present example, both the instruction detect ready flag and the instruction ready counter merely remain reset. The fast execution routine then exists and the indicator lamp display routine is performed.

It is recalled that the fast execution routine is carried out every 5 milliseconds. Let it be assumed that, while the dictation/transcription machine is disposed in its "scan" mode, a cue signal is detected. Hence, during the next cycle of the fast execution routine, and in particular, during the next cycle of the cue detect subroutine, the inquiry as to whether the cue signal is in the process of being detected is answered in the affirmative. In accordance with the example assumed herein, the dictation/transcription machine is not disposed in its "fast-forward" or "rewind" mode. Accordingly, the cue detect flag is set. At this time, the instruction detect ready flag is not set, and the instruction ready counter has not yet reached its preselected limit count. Indeed, in the present example, since detection of the cue signal now has commenced, the instruction ready counter exhibits its reset, initial count. Accordingly, the instruction ready counter is incremented by one count, and the fast execution routine exits to the indicator lamp display routine.

After the indicator lamp display routine is carried out, the fast execution routine is repeated, and this repetition continues for eight cycles. Then, the microprocessor exits from the indicator display routine to inquire whether the cue signal is in the process of being detected, and then to carry out the toggle, keyboard and microphone switch routines.

It is appreciated that, in accordance with the conditions of the present example, the instruction ready counter is incremented once every five milliseconds until it reaches its preselected limit count. That is, each time that the cue detect subroutine is carried out, the instruction ready counter is incremented. Let it be assumed that the cue signal which now is being detected from the magnetic tape is a letter indicating signal having the detected waveform shown in FIG. 8A. Upon detection of the cue signal, the cue detect flag is set, as shown in FIG. 8B. During each cycling of the cue detect subroutine, inquiry is made as to whether the cue signal is in the process of being detected. At the completion of the letter indicating signal (FIG. 8A), this inquiry is answered in the negative. However, since the cue detect flag (FIG. 8B) remains set, the instruction detect ready flag now is set. This is illustrated in FIG. 8C. Inquiry again is made as to whether the instruction ready counter has reached its preselected limit count. For a purpose that will soon become apparent, this preselected limit count is such that it is reached at a time that the second burst of cue signal in the instruction indicating signal is detected, taking variable high speeds of tape movement into consideration, that is, fast-forward and rewind speeds that are in the range of 10 to 25 normal recording speed. Since the instruction ready counter is incremented once during every cycle of the fast execution routine, then if the cue detect flag has been set, upon the termination of the cue signal which constitutes the letter indicating signal, the instruction ready counter will have reached a count which is less than its preselected limit count. Hence, even after the cue signal terminates, the instruction ready counter continues to be incremented.

Eventually, as the fast execution routine continues to cycle, the instruction ready counter will be incremented to its preselected limit count. It is assumed that, when this preselected limit count is reached, the instruction detect ready flag (FIG. 8C) still is set and the cue signal still is not detected. Thus, as the cue detect subroutine is carried out, it is determined that neither the letter nor the instruction detect flags are set, the cue detect enable flag is set, the cue signal is not detected, the cue detect flag is set, and the instruction detect ready flag is set. Then, inquiry is made as to whether the instruction ready counter has reached its preselected limit count. In the present example, this inquiry now is answered in the affirmative, as shown in FIG. 8D, and the letter detect flag now is set. This letter detect flag is illustrated in FIG. 8E. The next inquiry as to whether the dictation/transcription machine is disposed in its "fast-foward" or "rewind" modes is answered in the negative. Consequently, the pause counter, described previously with respect to FIG. 3, is not reset from its predetermined limit count, and operation of the fast motor is not interrupted. The cue detect and instruction detect ready flags, as well as the instruction ready counter, all are reset, as shown in FIGS. 8B, 8C and 8D, respectively; and the fast execution routine then exits to the indicator lamp display routine. After this indicator lamp display routine is carried out, the fast execution routine is repeated once again until it has been performed eight times.

After the fast execution routine has been carried out a predetermined number of times (for example, eight repetitions), the programmed microprocessor exits from the indicator lamp display routine to inquire whether the cue signal is in the process of being detected. As shown in FIG. 8A, this cue signal now is not detected. Hence, the letter detect flag which had been set when the instruction ready counter reached its preslected limit count now is reset, as shown in FIG. 8E. Then, the toggle, keyboard and microphone switch routines are carried out.

The programmed microprocessor then returns to carry out the pause and warning tone routines. As shown in FIG. 3, the inquiry as to whether the pause counter has reached its predetermined limit count is answered in the affirmative because the pause counter had not been reset in response to the setting of the letter detect flag, since the dictation/transcription machine is in its "scan" mode. Thus, a "pause" in the scan mode does not occur; nor is the warning tone generator energized. Rather, as each cue signal is detected in this "scan" mode, a suitable indication thereof is provided on display 24.

As the microprocessor continues to cycle through its program, the fast execution routine is performed, and thus, the cue detect subroutine, is carried out every 5 milliseconds. As shown in FIG. 7, under the present conditions, neither the letter not instruction detect flags are set, the cue detect enable flag is set and the cue signal is not detected. Since the cue detect flag has been reset in response to the setting of the letter detect flag, the instruction detect ready flag and the instruction ready counter both remain reset. The fast execution routine then exits to the indicator lamp display routine, and the foregoing is repeated a predetermined number (for example, eight) of cycles. Then, the toggle, keyboard and microphone switch routines are carried out. The programmed microprocessor continues through the routines illustrated in FIG. 2 such that the overall sequence is repeated every 40 milliseconds.

Let it now be assumed that dictation/transcription machine 10 remains disposed in the "scan" mode, and that an instruction indicator signal, such as that shown in FIG. 8F, is reproduced. The programmed microprocessor continues to carry out the aforementioned routines in the manner discussed above. When the keyboard switch routine is performed, since the dictation/transcription machine is disposed in its "scan" mode, the cue detect enable flag is set. The microprocessor then advances to the fast execution routine, which includes the cue detect subroutine shown in FIG. 7. Now, neither a letter nor an instruction detect flag is set, but the cue detect enable flag is set. Let it be assumed that the cue signal transducer now reproduces a cue signal. Accordingly, the inquiry as to whether a cue signal is in the process of being detected is answered in the affirmative. Since the dictation/transcription machine is not disposed in its "fast-foward" or "rewind" mode of operation, the cue detect flag is set. The inquiry as to whether the instruction detect ready flag is set is answered in the negative, and the inquiry as to whether the instruction ready counter has reached its preselected limit count also is answered in the negative. Accordingly, the instruction ready counter is incremented and the cue detect subroutine exits to the indicator lamp display routine.

The aforedescribed cycling of the fast execution and indicator lamp display routines continues. With each cycling of the fast execution routine, and thus, with each performance of the cue detect subroutine, the instruction ready counter is incremented by one count. Eventually, and as shown in FIG. 8F, the first burst of cue signal constituting the instruction indicating signal terminates. Then, when the cue detect subroutine next is performed, the inquiry as to whether the cue signal is in the process of being detected is answered in the negative. However, since the cue detect flag remains set, the instruction detect ready flag is set, as shown in FIG. 8H. The instruction ready counter continues to be incremented since, at the time that the instruction detect ready flag is set, the instruction ready counter has not yet reached its preselected limit count. The fast execution and indicator lamp display routines continue to cycle, and the microprocessor advances through the routines illustrated in FIG. 2.

During each cycle of the fast execution routine, the cue detect subroutine is carried out, and the instruction ready count is incremented. From FIG. 8F, it is appreciated that, prior to the time that the instruction ready counter attains its preselected limit count, the second burst of the cue signal constituting the instruction indicator signal is detected. When the cue detect subroutine is performed immediately following the detection of this second burst of cue signal, the inquiry as to whether the cue signal is in the process of being detected now is answered in the affirmative. The cue detect flag remains set, as shown in FIG. 8G, and the inquiry as to whether the instruction detect ready flag has been set now is answered in the affirmative. Accordingly, and as illustrated in FIG. 8I, the instruction detect flag now is set. The inquiry as to whether the dictation/transcription machine is disposed in its "search" mode is answered in the negative, as is the inquiry as to whether the machine is disposed in its "fast-forward" or "rewind" modes. Hence, the cue detect subroutine advances to reset the cue detect and instruction detect ready flags, as well as the instruction ready counter. The fast execution routine then exits to the indicator lamp display routine, and the foregoing cycle is repeated.

After the fast execution and indicator display routines have been repeated the predetermined number of times, the remaining toggle switch, keyboard switch and microphone switch routines are carried out. Then, the remaining letter and/or instruction indicating signals which may be recorded on the magnetic tape are detected and, preferably, the relative locations of such signals are indicated on index/instruction display 24, as the magnetic tape continues to be driven.

This "scan" mode of operation continues until the magnetic tape is fully rewound. At that time, the end-of-tape subroutine (not shown) included within the fast execution routine, sets the EOT flag. Then, when the microprocessor next carries out the pause and warning tone routines, and after the completion of the warning tone routine, the inquiry as to whether the EOT flag has been set is answered in the affirmative. Now that the tape is fully rewound to its beginning, the command for tape motion is cancelled, the respective output indicators are reset, and the cue generator flag (which, in the present example had not been set) is reset. Then, the fast execution and indicator lamp display routines are carried out, as discussed above.

Let it now be assumed that dictation/transcription machine 10 is disposed in the "search" mode in response to the actuation of SEARCH switch 54. It is recalled that, in this mode of operation, the magnetic tape is driven in the forward direction at its relatively fast speed.

When the programmed microprocessor carries out the keyboard switch routine following the actuation of the SEARCH switch, that portion of the routine illustrated in FIG. 4 is performed. Thus, since the dictation/transcription machine is disposed in the "search" mode, the cue detect enable flag is set. The microprocessor then returns to its START condition to proceed with the program shown in FIG. 2. Of course, during its programmed operation, the microprocessor carries out the fast execution routine, incuding the cue detect subroutine, described above. The manner in which letter and instruction indicating signals are detected is understood from the foregoing description. Thus, the cue detect subroutine functions in substantially the same manner as when the dictation/transcription machine is disposed in the "scan" mode. However, when the instruction detect flag is set (FIG. 8I) in response to the detection of the second burst of cue signal of the instruction indicating signal, the inquiry as to whether the "search" mode has been selected now is answered in the affirmative. Consequently, the existing tape motion, that is, the fast-forward motion of the magnetic tape, is cancelled, and dictation/transcription machine 10 is disposed in its "play" mode. The dictation/transcription machine is changed over from its "search" mode, wherein the magnetic tape is driven at its relatively high speed, to its "play" mode, whereby the instructional information now is reproduced.

Of course, during the next cycle of the fast execution routine when the cue detect subroutine is performed once again, the inquiry as to whether the letter or instruction detect flag has been set is answered in the affirmative. Accordingly, the cue detect and instruction detect ready flags now are reset, and the instruction ready counter also is reset. The fast execution routine then exits to the indicator lamp display routine.

The fast execution and indicator lamp display routines are repeated the predetermined number of times, and then the programmed microprocessor continues to carry out the remaining routines illustrated in FIG. 7. Eventually, when the second burst of cue signal terminates, the inquiry as to whether the cue signal is in the process of being detected is answered in the negative, and the instruction flag which had been set now is reset. The toggle, keyboard and microphone switch routines next are carried out in sequence; and the programmed microprocessor then returns to carry out the pause routine, the warning tone routine, and then a predetermined number of cycles of the fast execution and indicator lamp display routines, all as described above.

Dictation/transcription machine 10 now continues in its "play" mode of operation until the SEARCH switch is actuated once again, or until some other keyboard or microphone switch is actuated.

Let it now be assumed that microphone unit 12 is connected to dictation/transcription machine 10, and that fast-foward switch 35 thereon is actuated. It is appreciated that the microprocessor continues to cycle through the respective routines illustrated in FIG. 2. During the routine illustrated in FIG. 4, since the dictation/transcription machine is disposed in its "fast-foward" (microphone-initiated) mode, the cue detect enable flag is set. It is appreciated that this flag is sensed when the microprocessor carries out the cue detect subroutine of the fast execution routine.

In the cue detect subroutine illustrated in FIG. 7, the inquiry as to whether a letter or instruction detect flag has been set is answered in the negative, and the inquiry as to whether the cue detect enable flag has been set is answered in the affirmative. In the absence of a reproduced cue signal, the inquiry as to whether a cue signal is in the process of being detected is answered in the negative, and the inquiry as to whether the cue detect flag is set also is answered in the negative. Hence, the instruction detect ready flag and the instruction ready counter both remain reset, and the fast execution routine exits to the indicator lamp display routine. This path in the cue detect subroutine is followed until a cue signal is detected. At that time, the inquiry as to whether a cue signal is in the process of being detected is answered in the affirmative.

The next inquiry as to whether the dictation/transcription machine is disposed in its "fast-forward" or "rewind" mode also is answered in the affirmative. Hence, the fast motor now is disabled; and the pause counter is reset. Then, the cue detect and instruction detect ready flags, as well as the instruction ready counter, all remain reset and the fast execution routine exits to the indicator lamp display routine.

When the fast execution routine next is performed, the cue detect subroutine is carried out once again. As before, neither the letter nor the instruction detect flags are set, and the cue detect enable flag remains set. Now, however, since the fast motor has been disabled, the cue signals are not detected. Thus, the inquiry as to whether a cue signal is in the process of being detected is answered in the negative. Also, since the cue detect flag remains reset, the next inquiry as to whether this flag has been set also is answered in the negative. Consequently, the instruction detect ready flag remains reset and the instruction ready counter also remains reset at its initial count.

The foregoing sequential operation is repeated until the fast execution and indicator lamp display routines have been recycled the predetermined number of times. Then, the toggle, keyboard and microphone switch routines are carried out.

When the programmed microrocessor enters the pause routine, the inquiry as to whether the pause counter has reached its predetermined limit count is answered in the negative. This is because, when the cue signal had been detected, the pause counter had been reset. Accordingly, the pause counter is incremented once during each complete cycle of the programmed microprocessor. Furthermore, when the warning tone routine is carried out, the inquiry as to whether the pause counter has reached its predetermined limit count is answered in the negative so as to set the warning tone flag. Thus, a suitable indication is provided to apprise the user that a cue signal has been detected.

The foregoing operation is repeated, and the pause counter is incremented once during each complete cycle of the programmed microprocessor, for example, once every 40 milliseconds. While the pause counter is incremented, the fast motor remains disabled. Eventually, the pause counter reaches its predetermined limit count. Thus, when the warning tone routine next is carried out, the inquiry as to whether the pause counter has reached its predetermined limit count is answered in the affirmative so as to reset the warning tone flag and enable the fast motor. Consequently, fast-forward tape movement is resumed.

As the programmed microprocessor repeats the routines illustrated in FIG. 2, the aforedescribed operation is carried out once again. The magnetic tape continues to be driven in the forward direction at its fast speed and the cue detect subroutine is carried out repeatedly. When the next cue signal is detected, the fast motor is disabled once again so as to temporarily halt the tape, the pause counter is reset, and a suitable indication is provided. As before, when the pause counter is incremented to its predetermined limit count, the fast-forward movement of the tape is resumed.

In the foregoing description, the fast motor is disabled and the pause counter is reset whenever a cue signal is detected, regardless of whether this cue signal is included in a letter or instruction indicating signal. To prevent multiple detections of the same letter or instruction indicating signal, the cue detector is disabled for a sufficient period of time, such that when fast-forward movement of the tape is resumed, re-enabling of the cue detector is delayed. Thus, any cue signal which may remain in the letter or instruction indicating signal is not re-detected.

In one embodiment, when the cue signal is detected while dictation/transcription machine 10 is disposed in its "fast-forward" or "rewind" mode, a viewable indication of the detected cue signal is not provided on index-/instruction display 24, as is provided when the machine is disposed in its "scan" mode. In an alternative embodiment, letter and/or instruction indications are so provided.

If rewind switch 37 on microphone unit 12 is actuated, the operation described above with respect to the actuation of fast-forward switch 35 is carried out. Hence, in the interest of brevity, this description is not repeated herein.

From the foregoing description, it is seen that a single microprocessor advantageously is utilized to control the operation of dictation/transcription machine 10 in response to the actuation of various ones of the illustrated control switches. Furthermore, this programmed microprocessor is used to generate and record cue signals selectively as letter or instruction indicating signals. This same microprocessor also is used to control the machine in response to the reproduction of a cue signal and, moreover, to detect whether the reproduced cue signal constitutes a letter or an instruction indicating signal. This cue signal generation and detection is carried out as a function of the instructional clock rate at which the microprocessor carries out its respective routines. Moreover, this same instructional clock rate is used to establish a predetermined "pause" in tape movement whenever the cue signal is reproduced during selected modes of operation.

It is appreciated that the warning tone flag is set whenever the count of the pause counter is other than its predetermined limit count, and also whenever the cue generator flag is set, as described above. Thus, while a letter or instruction indicating signal is in the process of being recorded, an audible warning indication is provided to apprise the operator thereof. Of course, when the cue generator flag is reset, as when the letter or instruction flags are set, this audible warning indication is terminated.

While the present invention has been particularly shown and described with reference to a preferred embodiment, various changes and modifications in form and details may be made without departing from the spirit and scope of the invention. Examples of some changes and modifications have been described hereinabove. It should be readily apparent to those of ordinary skill in the art that various steps in the respective routines and subroutines which have been described herein may be modified or deleted, as desired. The numerical examples which have been discussed merely are illustrative and may be changed and modified as desired. For example, the frequency of the oscillating signal which is used as the cue signal may be any desired frequency, and need not be limited to 15 Hz. Also, the duration of the letter indicating signal need not be limited solely to the time needed to increment the cue counter to a count of 32. Similarly, the spacing between iterative bursts of the cue signal can be other than that described above, and the second burst of cue signal constituting the instruction indicating signal may exhibit any other desired duration. Likewise, the preselected limit count of the instruction ready counter can be any suitable count which is sufficient to provide adequate time during which a succeeding burst of cue signal included within an instruction indicating signal can be detected. Still further, the preferred embodiment of the present invention has been described with reference to particular modes of operation of the dictation/-transcription machine. The cue signal may be generated and/or detected during other modes, as may be desired.

It is, therefore, intended that the appended claims be interpreted as including these as well as other changes and modifications.

What is claimed is:

1. In apparatus for recording information on a record medium, said apparatus including a programmed processor which advances through a sequence of instructions at an instruction clock rate for selecting and controlling predetermined operating conditions, a method of recording a predetermined cue signal comprising the sequential steps of (a) detecting the actuation of a cue signal recording switch; (b) sensing if a cue signal cycle counter has reached a preselected count and, if not, incrementing said cue signal cycle counter by one count and, if so, resetting said cue signal cycle counter to an initial count and incrementing a cue counter by one count; (c) sensing if the count of said cue counter is less than a particular count and, if so, recording said cue signal and, if not, terminating the recording of said cue signal; (d) continuing to record said cue signal until said cue counter reaches said particular count even if said cue signal recording switch is deactuated prior to the reaching of said particular count; and (e) substantially periodically repeating steps (a) through (d).

2. The method of claim 1 further comprising the steps of generating a bi-state signal whose state changes between a first and a second level each time said cue signal cycle counter is reset; and using said bi-state signal as said cue signal.

3. The method of claim 2 further comprising the step of resetting said cue signal cycle counter to said initial count once said cue counter reaches said particular count.

4. The method of claim 1 wherein said steps (a) through (e) are performed in timed sequence.

5. In apparatus for recording information on a record medium, said apparatus including a programmed processing unit for selecting and controlling predetermined operating conditions, a method of selectively recording an indicating signal comprising the sequential steps of (a) detecting the selective actuation of a cue signal switch; (b) sensing if a cue signal cycle counter has reached a predetermined count following the actuation of said cue signal switch; (c) incrementing said cue signal cycle counter by one count if said predetermined count has not been reached, and resetting said cue signal cycle counter to an initial count if said predetermined count has been reached and also incrementing a cue counter by one count; (d) sensing if the count of said cue counter is less than a first count; (e) recording a cue signal if said cue counter is less than said first count; (f) interrupting the recording of said cue signal when said cue counter reaches said first count; (h) resuming the recording of said cue signal when said cue counter reaches a second count; (i) terminating the recording of said cue signal when said cue counter reaches a third count; and (j) substantially periodically repeating steps (a) through (i).

6. The method of claim 5 further comprising the steps of resetting said cue signal cycle counter to said initial count while said cue counter is incremented from said first count to said second count; generating an output signal whose phase reverses each time that said cue signal cycle counter is reset; and utilizing said output signal as said cue signal.

7. The method of claim 6 wherein said selective actuation of said cue signal switch comprises an initial actuation thereof, and a re-actuation thereof prior to the time that the count of said cue counter reaches said first count.

8. The method of claim 7 further comprising the steps of setting a first flag signal upon the initial actuation of said cue signal switch; setting a second flag signal when said initial actuation of said cue signal switch is terminated; setting a third flag signal upon said re-actuation of said cue signal switch prior to the time that the count of said cue counter reaches said first count; and resetting said first, second and third flags when the count of said cue counter reaches said third count.

9. In apparatus for recording information on a record medium, said apparatus including a programmed processor unit for selecting and controlling predetermined operating conditions, a method of selectively recording a first or second type of indicating signal, comprising the steps of (a) detecting the actuation of a cue signal switch; (b) if said cue signal switch is actuated, incrementing the count of a cue counter by one count at substantially periodic intervals in the program of said processor unit; (c) sensing if the count of said cue counter is less than a first count; (d) recording a cue signal if the count of said cue counter is less than said first count; (e) detecting the deactuation of said cue signal switch when the count of said cue counter is less than said first count; (f) interrupting the recording of said cue signal when the count of said cue counter reaches said first count; (g) detecting the re-actuation of said cue signal switch prior to the count of said cue counter reaching said first count; (h) commencing the recording of another cue signal when the count of said cue counter reaches a second count provided that said cue signal switch has been re-actuated prior to the count of said cue counter reaching said first count; (i) terminating the recording of said cue signal when the count of said cue counter reaches a third count and resetting said cue counter to an initial count; and (j) substantially periodically repeating steps (a) through (i).

10. The method of claim 9 further comprising the steps of periodically sensing if the count of a cue signal cycle counter has reached a preselcted count, following the detected initial actuation of said cue signal switch; incrementing the count of said cue signal cycle counter by one count if a respective sensed count of said cue signal cycle counter has not reached said preselected count; resetting the count of said cue signal cycle counter to an initial count if said respective sensed count thereof is equal to said preselected count and also incrementing said count of said cue counter; reversing the phase of an output signal at each resetting of said cue signal cycle counter; and utilizing said output signal as said cue signal.

11. The method of claim 10 further comprising the step of resetting the count of said cue signal cycle counter to said initial count while the count of said cue counter is incremented from said first count to said second count.

12. The method of claim 9 further comprising the step of inhibiting said recording of another cue signal if said cue signal switch is not re-actuated prior to the count of said cue counter reaching said first count.

13. The method of claim 12 further comprising the steps of setting a first flag signal when said cue signal switch is initially actuated to enable the recording of said cue signal; setting a second flag signal if said cue signal switch is de-actuated while said first flag signal is set; resetting and first and second flag signals when said count of said cue counter reaches said first count; setting a third flag signal if said cue signal switch is re-actuated while said second flag signal is set; inhibiting the resetting of said first and second flag signals when said third flag signal is set; sensing when the count of said cue counter reaches said third count if said third flag signal is set; and resetting at least said first flag signal when the count of said cue counter reaches said third count.

14. A method of operating a programmed processor unit for selecting and controlling predetermined operating conditions in dictating apparatus, comprising carrying out sequential instructional routines during a program cycle including a pause routine to stop temporarily the recording medium used with said dictating apparatus upon the detection of predetermined conditions and to provide an indication to the user of said dictating apparatus; a fast execution routine carried out repeatedly a predetermined plural number of times during each program cycle; a first switch routine to sense the selected actuation of a first group of switches and to establish an operating condition in accordance therewith; and at least a second switch routine to sense the selected actuation of at least a second group of switches and to establish an operating condition in accordance therewith, said routines including the steps of (a) detecting the actuation of a cue signal switch; (b) if said cue signal switch is actuated, incrementing the count of a cue counter by one count; (c) sensing the count of said cue counter; (d) recording a cue signal if said cue signal switch is actuated and said count of said cue counter remains less than a predetermined value; (e) terminating the recording of said cue signal when said count reaches said predetermined value; and (f) repeating at least some of steps (a) through (e) once during each performance of said fast execution routine.

15. The method of claim 14 further including the steps of detecting the de-actuation of said cue signal switch prior to the time that the count of said cue counter reaches said predetermined value; detecting the re-actuation of said cue signal switch prior to the time that the count of said cue counter reaches said predetermined value; continuing the incrementing of the count of said cue counter beyond said predetermined value if said cue signal switch is re-actuated prior to the time that the count of said cue counter reaches said predetermined value; commencing the recording of another cue signal if the count of said cue counter reaches a second, higher predetermined value; terminating the recording of said other cue signal if the count of said cue counter reaches a third, still higher, predetermined value; and repeating the foregoing steps at least once during each program cycle.

16. Cue signal recording apparatus operative in a dictation device to record a cue signal on a record medium, said apparatus comprising cue signal switch means actuable to initiate the recording of a cue signal; switch detecting means for detecting when sad cue signal switch means is actuated and for detecting when said cue signal switch means is not actuated; a cue counter; count sensing means for sensing the count then present in said cue counter and for determining if said count is less than a predetermined value; means for incrementing said cue counter by one count if said sensed count is less than said predetermined value; a source of cue signal; recording means for recording said cue signal if said switch detecting means detects that said cue signal switch means has been actuated; and interrupt means for interrupting the recording of said cue signal when said count sensing means determines that the count then present in said cue counter has reached said predetermined value.

17. The apparatus of claim 16 wherein said source of cue signal comprises a cue signal cycle counter; second count sensing means for sensing the count then present in said cue signal cycle counter and for determining if said last-mentioned count is less than a threshold value; means for incrementing said cue signal cycle counter by one count if said sensed last-mentioned count is less than said threshold value; means for resetting said cue signal cycle counter to an initial count when said sensed last-mentioned count reaches said threshold value; and means for producing an output cue signal whose phase reverses in response to the resetting of said cue signal cycle counter.

18. The apparatus of claim 17 wherein said means for incrementing said cue counter by one count comprises means responsive to the resetting of said cue signal cycle counter to increment said cue counter.

19. Indicating signal recording apparatus operative in a dictation device to record an indicating signal on a record medium, said apparatus comprising switch means selectively actuable to initiate the recording of an indicating signal; switch detecting means for detecting when said switch means is actuated for the recording of said indicating signal; a counter; count sensing means for sensing the count then present in said counter; means for incrementing said counter by one count if the sensed count is less than a threshold level; a source of cue signal; recording means for recording said cue signal if said switch detecting means detects that said switch means has been actuated; interrupt means for interrupting the recording of said cue signal when the sensed count reaches a first count; and means for resuming the recording of said cue signal when the sensed count reaches a second count and for continuing the recording of said cue signal until the sensed count reaches said threshold level.

20. The apparatus of claim 19 wherein said source of cue signal comprises a cue signal cycle counter; second count sensing means for sensing the count then present in said cue signal cycle counter and for determining if said last-mentioned count is less than a particular value; means for incrementing said cue signal cycle counter by one count if said sensed last-mentioned count is less than said particular value; means for resetting said cue signal cycle counter to an initial count when said sensed last-mentioned count reaches said particular value; and means for producing an output cue signal whose phase reverses in response to the resetting of said cue signal cycle counter.

21. The apparatus of claim 20 wherein said means for incrementing said cue counter by one count comprises means responsive to the resetting of said cue signal cycle counter to increment said cue counter.

22. The apparatus of claim 21 wherein said interrupt means comprises means for resetting said cue signal cycle counter to said initial count when the sensed count of said cue counter is incremented from said first count to said second count.

23. The apparatus of claim 19 wherein said indicating signal is recorded in response to the interactive actuation of said switch means; and wherein said means for resuming the recording of said cue signal is operative if said switch detecting means detects that said switch means has been actuated iteratively prior to the time that said sensed count reaches said first count.

24. The apparatus of claim 23 further comprising first flag means for setting a first flag signal when said switch detecting means detects an initial actuation of said switch means; second flag means operative if said first flag signal is set for setting a second flag signal when said switch detecting means detects the termination of said initial actuation of said switch means prior to the time that said sensed count reaches said first count; third flag means operative if said second flag signal is set for setting a third flag signal when said switch detecting means detects the iterative actuation of said switch means prior to the time that said sensed count reaches said first count; and flag reset means for resetting said first flag signal when said sensed count reaches said first count if said second flag signal is not set, for resetting said second flag signal when said sensed count reaches said first count if said third flag signal is not set, and for resetting said first, second and third flag signals when said sensed count reaches said threshold level, whereby the recording of said cue signal is resumed only if said third flag signal is set.

25. Indicating signal recording apparatus operative in a dictation device to record a first or second type of indicating signal on a record medium, said apparatus comprising switch means selectively actuable to initiate the recording of an indicating signal; switch detecting means for detecting the actuation of said switch means; a cue signal cycle counter; first count sensing means responsive to the actuation of said switch means for sensing the count then present in said cue signal cycle counter; means for incrementing the count of said cue signal cycle counter by one count if said count is less than a particular value; means for resetting said cue signal cycle counter to an initial count when said sensed count thereof reaches said particular value; means for producing an output cue signal whose phase reverses in response to the resetting of said cue signal cycle counter; a cue counter; means for incrementing the count of said cue counter by one count in response to the resetting of said cue signal cycle counter; second count sensing means for sensing the count then present in said cue counter; means for recording said output cue signal until the count of said cue counter reaches a first count, whereupon the recording of said output cue signal is interrupted; means for resuming the recording of said output cue signal when said count of said cue counter reaches a second count, provided that said switch detecting means detects the de-actuation and re-actuation of said switch means prior to the time that said count of said cue counter reaches said first count; and means for terminating the resumed recording of said output cue signal when the count of said cue counter reaches a third count.

26. The apparatus of claim 25 further comprising means for resetting said cue signal cycle counter to said initial count when the count of said cue counter reaches said first count.

27. The apparatus of claim 25 further comprising first flag means for setting a first flag signal in response to the initial actuation of said cue switch means to enable the operation of said first count sensing means.

28. The apparatus of claim 27 further comprising means for resetting said first flag signal when the count of said cue counter reaches said first count if said switch means has not been re-actuated, whereby said cue signal cycle counter remains at said initial count and the recording of said output cue signal terminates.

29. The apparatus of claim 28 further comprising second flag means for setting a second flag signal if said first flag signal is set and said switch means has been reactuated, so as to inhibit the resetting of said first flag signal.

30. The apparatus of claim 29 further comprising means for resuming the incrementing of said cue signal cycle counter when the count of said cue counter reaches said second count and said second flag signal is set.

31. The apparatus of claim 30 further comprising means for resetting both said first and second flag signals when the count of said cue counter reaches said third count, so as to terminate the recording of said output cue signal.

32. A method of selectively detecting a first type of indicating signal, recorded on a record medium as a burst of cue signal, or a second type of indicating signal, recorded on said record medium as successive bursts of said cue signal, said method comprising the sequential steps of (a) detecting the reproduction of a cue signal from said record medium; (b) incrementing a counter by one count in response to the detected cue signal; (c) detecting if the cue signal reproduced from said record medium has terminated; (d) sensing if said counter has reached a preselected count; (e) repeating steps (a) through (d); and (f) indicating the detection of said first type of indicating signal when said counter reaches said preselected count and indicating the detection of said second type of indicating signal when the reproduction of a cue signal from said record medium is detected once again prior to the time that said counter reaches said preselected count.

33. The method of claim 32 further comprising the step of resetting said counter to an initial count in response to the indication of said first or second type of indicating signal.

34. The method of claim 33 wherein said sequential steps are performed at a clocked rate such that the time required for said counter to be incremented from the initial count thereof to said preselected count is greater than the expected time interval between the beginning of a burst of cue signal and the beginning of the next-following successive burst of cue signal.

35. The method of claim 34, further comprising the steps of setting a first flag signal when the reproduction of a cue signal from said record medium is detected; setting a second flag signal when the termination of the cue signal reproduced from said record medium is detected; indicating the detection of said second type of indicating signal if (i) said second flag signal is set and (ii) the reproduction of said cue signal from said record medium is detected; and indicating the detection of said first type of indicating signal if (i) said second flag signal is set and (ii) the reproduction of said cue signal from said record medium is not detected and (iii) said counter reaches said preselected count.

36. A method of controlling a signal reproducing machine in response to first or second types of indicating signals reproduced from a record medium, said first type of indicating signal being formed as a burst of cue signal and said second type of indicating signal being formed as successive bursts of said cue signal, said method comprising the steps of advancing said record medium in a selected mode of operation; detecting the reproduction of a cue signal from said record medium; if a cue signal is detected while said record medium is being advanced in a first mode of operation, temporarily halting said record medium and providing an indication thereof, and resuming the advance of said record medium; if a cue signal is detected while said record medium is being advanced in a second mode of operation, (a) incrementing a counter by one count, (b) detecting if the cue signal has terminated, (c) sensing if said counter has reached a preselected count, (d) repeating steps (a) through (c) until either (i) said counter reaches said preselected count or (ii) the termination followed by the resumption of said cue signal is detected, and (e) indicating the detection of said first type of indicating signal if said counter reaches said preselected count and indicating the detection of said second type of indicating signal if the termination followed by the resumption of said cue signal is detected prior to the time that said counter reaches said preselected count.

37. The method of claim 36, further comprising resetting said counter to an initial count in response to at least the indication of the detection of said second type of indicating signal.

38. The method of claim 36 further comprising initiating a selected operation of said signal reproducing machine when said record medium is being advanced in a second mode of operation of a first type in response to the indication of the detection of a selected one of said indicating signals.

39. A method of operating a programmed processor unit for selecting and controlling predetermined operating conditions in dictating and/or transcribing apparatus, comprising carrying out sequential instructional routines during a program cycle including a pause routine to stop temporarily the record medium used with said apparatus upon the selected detection of indicating signals recorded on said record medium and to provide an indication to the user of said apparatus; a fast execution routine carried out repeatedly a predetermined plural number of times during each program cycle; a first switch routine to sense the selected actuation of a first group of switches and to establish an operating condition in accordance therewith; and at least a second switch routine to sense the selected actuation of at least a second group of switches and to establish an operating condition in accordance therewith; said fast execution routine including a method of selectively detecting a first or second type of indicating signal reproduced from said record medium, said first type of indicating signal being formed as a burst of cue signal and said second type of indicating signal being formed as successive bursts of said cue signal, said last-mentioned method comprising the steps of (a) detecting the reproduction of a cue signal from said record medium; (b) incrementing a counter by one count if a cue signal has been detected; (c) detecting if said cue signal reproduced from said record medium has terminated; (d) sensing if said counter has reached a preselected count; (e) repeating steps (a) through (d) once during each performance of the fast execution routine; and (f) indicating the detection of said first type of indicating signal when said counter reaches said preselected count and indicating the detection of said second type of indicating signal when the reproduction of said cue signal from said record medium resumes prior to the time that said counter reaches said preselected count.

40. The method of claim 39 further comprising the steps of establishing an initial count of a pause counter if said operating condition of said apparatus corresponds to selected modes; incrementing said pause counter by one count during each performance of said pause routine; sensing when the count of said pause counter is equal to a predetermined value; inhibiting the movement of said record medium when said count of said pause counter is not equal to said predetermined value; and producing an audible signal when said count of said pause counter is not equal to said predetermined value.

41. The method of claim 40 wherein said initial count of said pause counter is estabished when the detection of either said first or second type of indicating signal is indicated.

42. The method of claim 40 wherein said initial count of said pause counter is established if said operating condition of said apparatus corresponds to a particular mode and the reproduction of a cue signal from said record medium is detected.

43. The method of claim 39 further comprising the steps of setting a cue detect flag signal when a cue signal is initially detected; setting a ready flag signal when the reproduction of said cue signal terminates; resetting said cue detect and ready flag signals if said counter reaches said preselected count and also indicating the detection of said first type of indicating signal; and detecting the reproduction of a cue signal from said record medium when said ready flag signal is set to indicate the detection of said second type of indicating signal and also to reset said cue detect and ready flag signals.

44. The method of claim 43 further comprising changing over the operating condition of said apparatus to a playback mode to reproduce audio signals from said record medium when the detection of said second type of indicating signal is indicated, provided that the operating condition of said apparatus had corresponded to a predetermined type.

45. Indicating signal detecting apparatus operative in a recording and/or reproducing device for detecting either a first type of indicating signal, recorded on a record medium as a burst of cue signal, or a second type of indicating signal, recorded on said record medium as successive bursts of said cue signal, said apparatus comprising means for reproducing a cue signal from said record medium; detecting means for detecting the presence or absence of the reproduced cue signal; a counter; count sensing means for sensing the count then present in said counter and for determining if said count is less than a preselected count; means for periodically incrementing said counter if a reproduced cue signal has been detected and if said sensed count is less than said preselected count; first indicating signal means for indicating the detection of said first type of indicating signal when said sensed count reaches said preselected count while said detecting means detects the absence of said reproduced cue signal; flag signal means for producing a flag signal when said detecting means detects the presence of said reproduced cue signal followed by the absence thereof; and second indicating signal means for indicating the detection of said second type of indicating signal when said detecting means detects the presence of said reproduced cue signal and said flag signal is produced.

46. The apparatus of claim 45 further comprising means for establishing a predetermined mode of operation of said recording and/or reproducing device whereby said record medium is driven at a relatively high speed; temporary stop means for temporarily stopping the driving of said record medium when said detecting means detects the presence of said cue signal reproduced during said predetermined mode of operation; and inhibit means responsive to the operation of said temporary stop means to inhibit said first and second indicating signal means.

47. The apparatus of claim 45 further comprising means for establishing a preselected mode of operation of said recording and/or reproducing device whereby said record medium is searched at a relatively high speed for a second type of indicating signal; change-over means for changing over the operation of said device from said preselected mode to a playback mode when said second indicating signal means indicates the detection of said second type of indicating signal; and counter reset means responsive to the operation of said change-over means for resetting the count of said counter to an initial count.

48. The apparatus of claim 45 further comprising cue flag means for producing a cue flag signal when said detecting means detects the presence of said reproduced cue signal, said first-mentioned flag signal means being responsive to the concurrence of said cue flag signal and the absence of said reproduced cue signal to produce said first-mentioned flag signal.

49. The apparatus of claim 48, further comprising flag reset means for resetting said first-mentioned and cue flag signals when either said first or second type of indicating signal is detected; and counter reset means for resetting said counter to an initial count when at least said first-mentioned flag signal is reset.

* * * * *